US012214909B1

(12) United States Patent
Baghdasarian

(10) Patent No.: US 12,214,909 B1
(45) Date of Patent: Feb. 4, 2025

(54) DISPENSING HINGE ASSEMBLY

(71) Applicant: Maxar Space LLC, Palo Alto, CA (US)

(72) Inventor: Varouj Baghdasarian, Cupertino, CA (US)

(73) Assignee: Maxar Space LLC, Palo Alto, CA (US)

( * ) Notice: Subject to any disclaimer, the term of this patent is extended or adjusted under 35 U.S.C. 154(b) by 0 days.

(21) Appl. No.: 18/353,548

(22) Filed: Jul. 17, 2023

(51) Int. Cl.
B64G 1/22 (2006.01)
(52) U.S. Cl.
CPC .................. B64G 1/2222 (2023.08)
(58) Field of Classification Search
CPC ........ B64G 1/22; B64G 1/222; B64G 1/2221;
B64G 1/2222; B64G 1/2223; B64G
1/2224; B64G 1/2228; B64G 1/2229;
B64G 1/64; B64G 1/641; B64G 1/642;
B64G 1/643; B64G 1/644; B64G 1/645;
B64G 1/6457; E05D 7/12; E05D 7/1066;
E05D 2077/128; Y10T 403/608
USPC ........................................................ 244/173.3
See application file for complete search history.

(56) References Cited

U.S. PATENT DOCUMENTS

| 5,673,459 A | 10/1997 | Baghdasarian | |
| 6,126,115 A * | 10/2000 | Carrier | B64G 1/6457 294/82.26 |
| 6,244,541 B1 * | 6/2001 | Hubert | F16F 1/54 244/54 |
| 6,494,406 B1 * | 12/2002 | Fukushima | B64G 1/002 244/173.3 |
| 7,275,285 B1 * | 10/2007 | Lorell | B64G 1/222 16/286 |
| 8,708,322 B2 * | 4/2014 | Young | B64G 1/642 269/160 |
| 8,770,522 B1 | 7/2014 | Murphey et al. | |

(Continued)

FOREIGN PATENT DOCUMENTS

| CN | 110304282 B | 9/2020 |
| CN | 115258195 A | 11/2022 |

(Continued)

OTHER PUBLICATIONS

U.S. Appl. No. 18/353,534, filed Jul. 17, 2023.

(Continued)

Primary Examiner — Joshua E Rodden
(74) Attorney, Agent, or Firm — Vierra Magen Marcus LLP

(57) ABSTRACT

Technology is disclosed herein for a payload dispensing hinge assembly. The payload dispensing hinge assembly has a first hinge-half and a second hinge-half that are joined by a hinge pin. The first hinge-half may be connected to a payload that is to be dispensed at a target angle. The second hinge-half may be connected to a payload base. The first hinge-half may have a first mounting bracket and a rotatable arm that are shaped to form interlocks that serve to disengageably link these two components. A biasing mechanism rotates the rotatable arm and hence the first mounting bracket and payload about a hinge line. The second hinge-half has a hinge stop that stops the rotation of the rotatable arm at a target angle, whereby the first bracket dis-engages from the rotatable arm to dispense the payload at the target angle.

20 Claims, 23 Drawing Sheets

(56) References Cited

U.S. PATENT DOCUMENTS

| | | | |
|---|---|---|---|
| 9,450,131 | B1 | 9/2016 | Spence et al. |
| 10,276,926 | B2 | 4/2019 | Cwik et al. |
| 10,370,124 | B2 | 8/2019 | Dube |
| 10,661,918 | B2 * | 5/2020 | Schwarz ................. B64G 4/00 |
| 11,377,235 | B2 | 7/2022 | Johnson et al. |
| 11,492,147 | B2 | 11/2022 | Welle |
| 11,577,861 | B1 | 2/2023 | Baghdasarian et al. |
| 11,787,572 | B1 * | 10/2023 | Thompson ............. B64G 1/641 |
| | | | 244/173.3 |
| 11,878,820 | B1 * | 1/2024 | Thompson ............. B64G 1/645 |
| 11,962,272 | B2 * | 4/2024 | Baghdasarian ......... H02S 20/30 |
| 2017/0320597 | A1 * | 11/2017 | Lim ....................... B64G 1/642 |
| 2018/0170586 | A1 | 6/2018 | Riskas |
| 2022/0033111 | A1 | 2/2022 | Welle |
| 2024/0286769 | A1 * | 8/2024 | Behar ..................... F16B 2/185 |

FOREIGN PATENT DOCUMENTS

| | | | | |
|---|---|---|---|---|
| CN | 115610712 A | 1/2023 | | |
| EP | 1013546 A2 * | 6/2000 | ............ | B64G 1/002 |
| EP | 3333086 B1 | 5/2020 | | |
| EP | 3569508 B1 | 1/2022 | | |
| EP | 3781482 B1 | 6/2023 | | |
| GB | 2455311 A | 6/2009 | | |

OTHER PUBLICATIONS

International Search Report & The Written Opinion of the International Searching Authority dated Oct. 9, 2024, International Application No. PCT/US2024/038033.

* cited by examiner

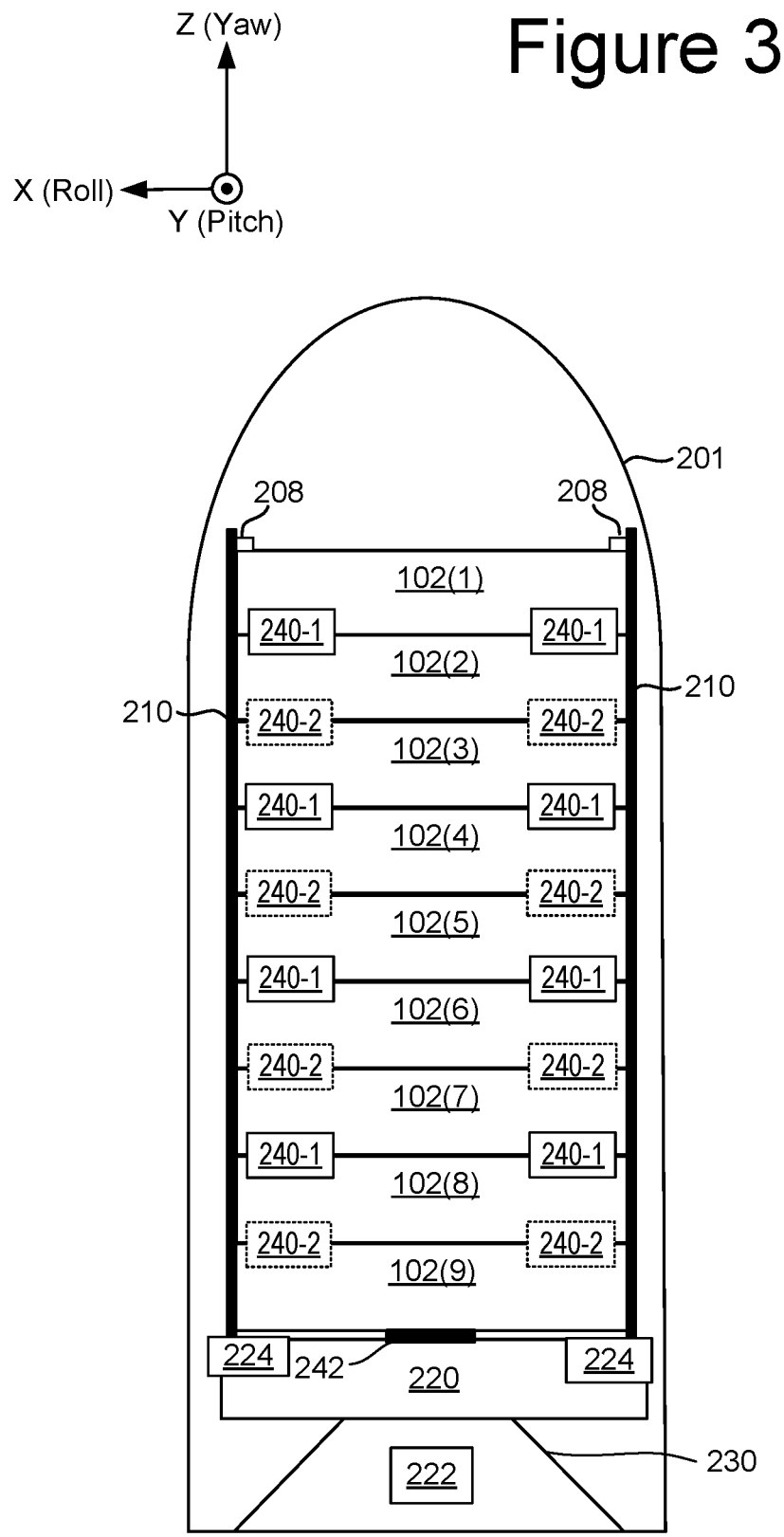

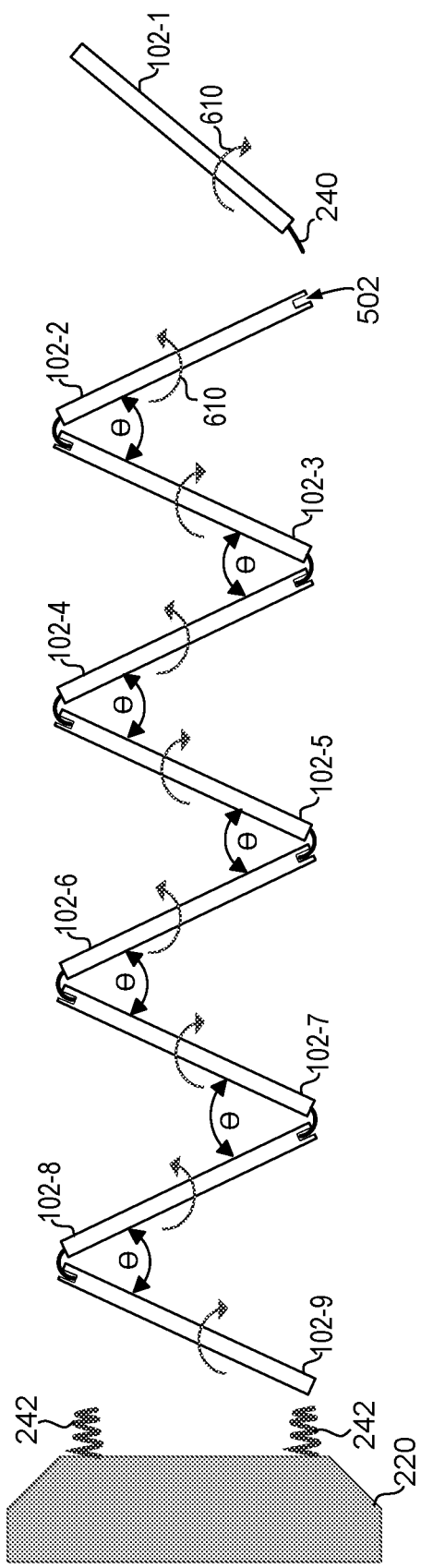
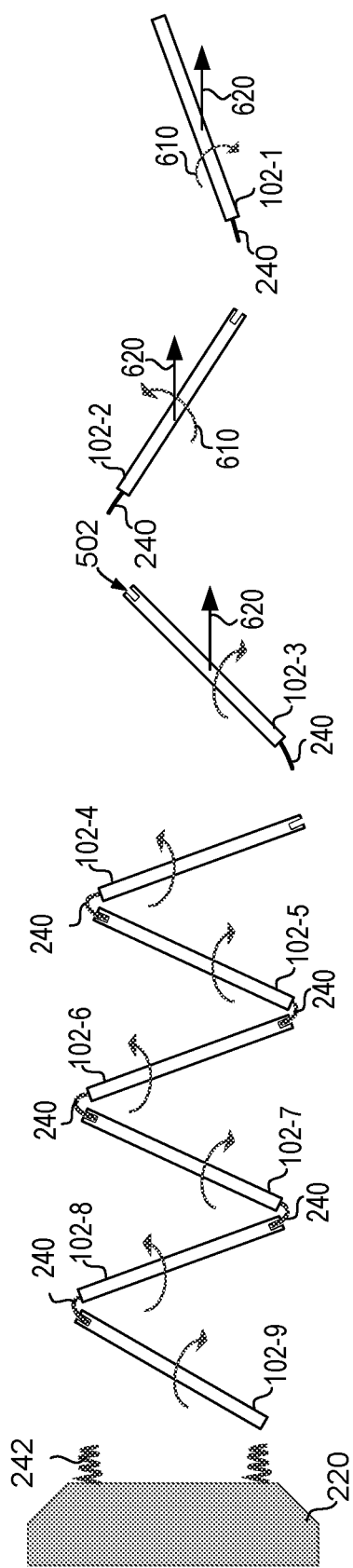
Figure 6C
Figure 6D

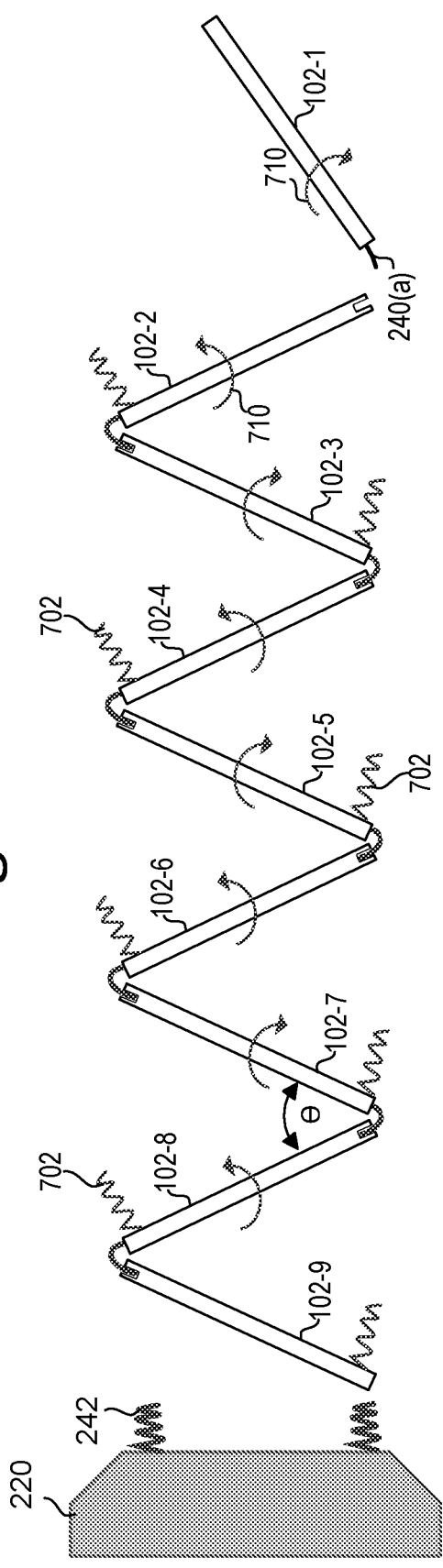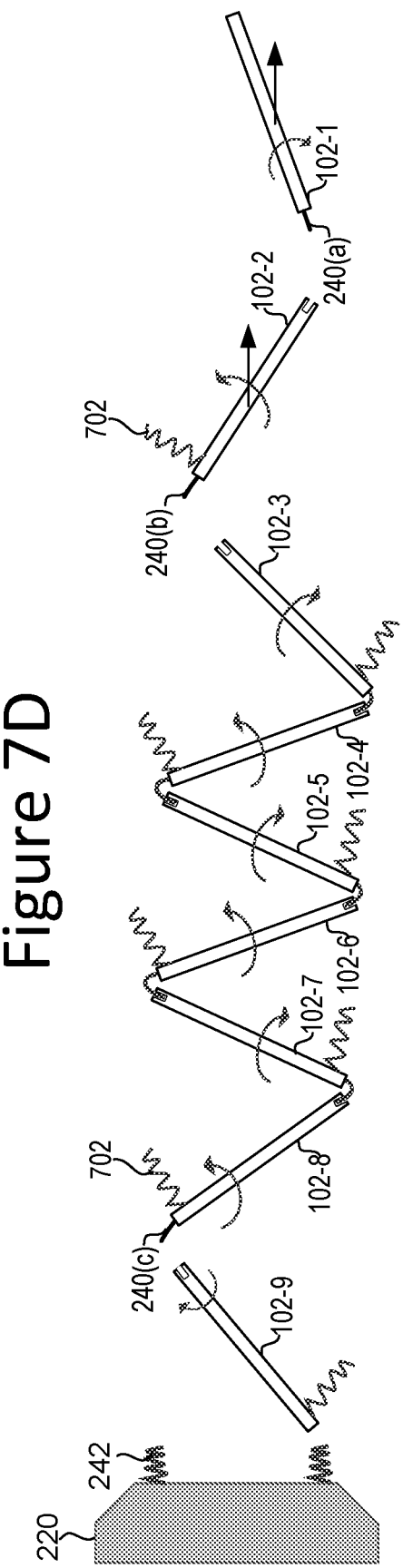

Figure 16B
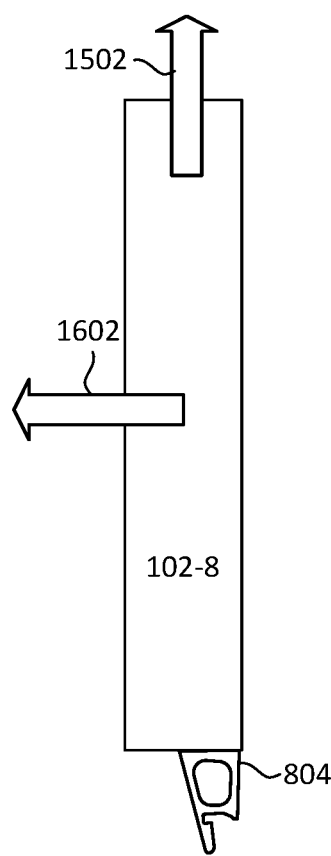
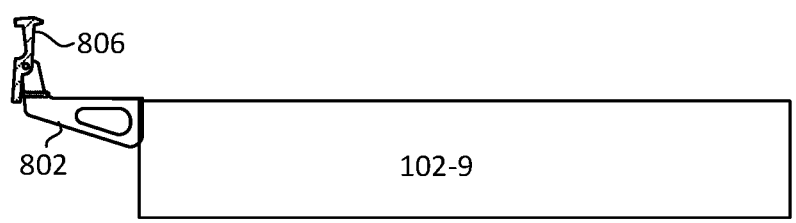

DISPENSING HINGE ASSEMBLY

BACKGROUND

The cost to launch spacecraft such as satellites into orbit is extraordinarily expensive. The cost per spacecraft can be reduced by launching multiple spacecraft with one launch vehicle. A tie-down and release mechanism may be used to hold a stack of spacecraft to the launch vehicle, typically by holding the stack of spacecraft to a launch vehicle adaptor. The tie-down and release mechanism may also be referred to as a launch restraint and dispensing structure. Once in orbit, the spacecraft may be dispensed from the tie-down and release mechanism.

The tie-down and release mechanism may have hold-down rods or the like that clamp the spacecraft to the launch vehicle adaptor. The hold-down rods may be highly tensioned and may also be referred to as tension rods. In order to dispense (or deploy) the spacecraft the hold-down rods are released such that they no longer clamp down the stack of spacecraft. Upon releasing the tension rods the entire stack of spacecraft may be released at once. This type of release may result in spacecraft bumping into each other thereby causing structural damage and/or performance degradation to the spacecraft and its equipment.

FIGS. 1A-1D depict one possible technique for dispensing a stack of spacecraft. FIG. 1A depicts a stack 10 of spacecraft 12 held to a launch adaptor 14 by a tie-down and release mechanism. The tie-down and release mechanism has a tension rod 16, top clamp 18, and release mechanism 20. There will typically be additional tension rods and clamps but those are not depicted in FIG. 1A. FIG. 1B depicts the initial dispensing of the spacecraft 12 after the tension rods have been moved to a deployment position. The tension rods are not depicted in FIG. 1B so as to not obscure the diagram. Springs 22 that are attached to the launch vehicle adaptor 14 push the stack of spacecraft 12 away from the launch vehicle adaptor 14. FIG. 1C depicts a later stage of dispensing of the spacecraft in which the spacecraft 12 continue to move away from the launch vehicle adaptor 14. The spacecraft 12 may begin to tumble, as indicated by rotation arrows 24. In the example in FIG. 1C all of the spacecraft 12 are tumbling in the same direction (clockwise in this example). FIG. 1D depicts a still later stage of dispensing the spacecraft 12. Some of the spacecraft 12 may bump into another spacecraft 12 thereby causing structural damage and/or performance degradation. Significantly, the spacecraft 12 typically have sensitive equipment that can easily be damaged.

BRIEF DESCRIPTION OF THE DRAWINGS

FIG. 3 an embodiment of a launch configuration for a spacecraft within a fairing of a launch vehicle.

FIGS. 6A, 6B, 6C, and 6D depict one embodiment of a system for dispensing a stack of spacecraft.

FIGS. 7A, 7B, 7C, and 7D depict another embodiment of a system for dispensing a stack of spacecraft.

FIGS. 16A and 16B depicts further details of deploying a spacecraft at a target angle using an embodiment of the payload dispensing hinge assembly.

DETAILED DESCRIPTION

Figure 1A:
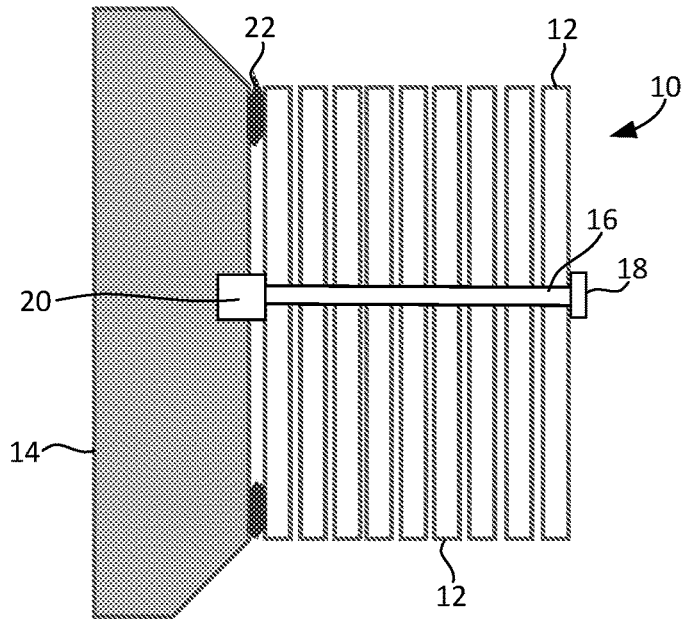
FIGS. 1A, 1B, 1C and 1D depict one possible technique for dispensing a stack of spacecraft.
Figure 1B:
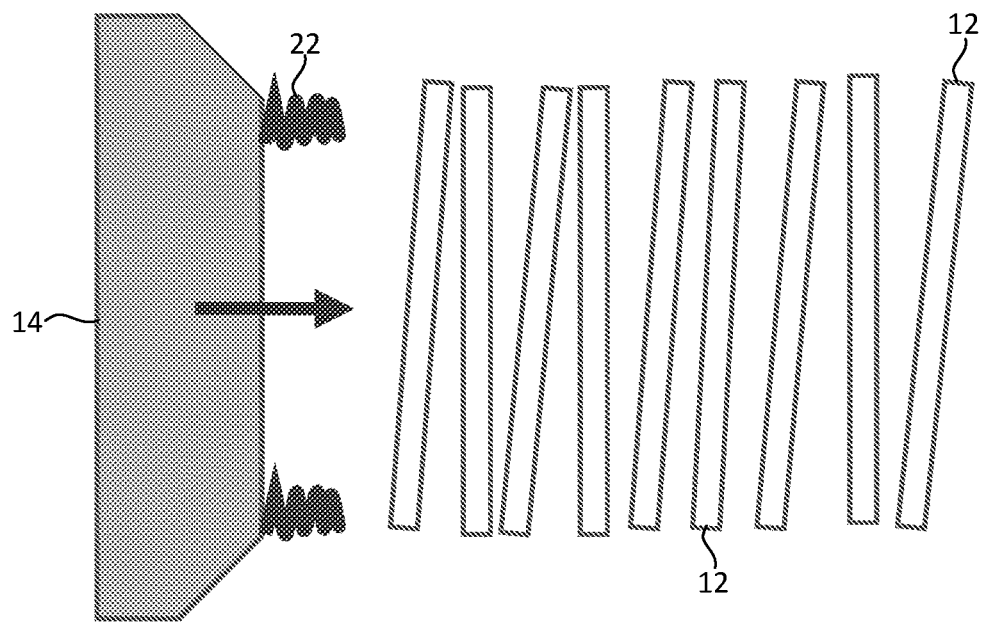
Figure 1C:
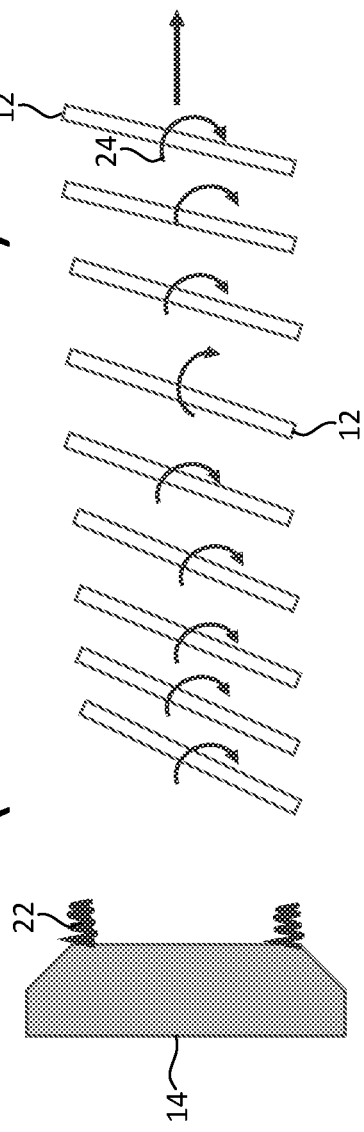
Figure 1D:
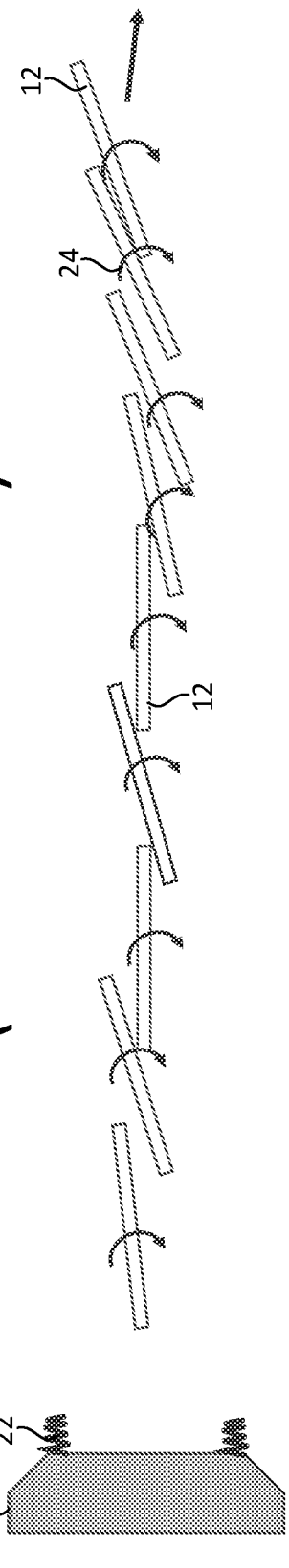

An embodiment of technology disclosed herein is for dispensing stacked spacecraft. In an embodiment, initially the stack of spacecraft are held to a launch adaptor by a tie-down mechanism. The stack of spacecraft may be joined together in an accordion configuration by dis-engageable links. A dis-engageable link may join two adjacent spacecraft at one edge of the spacecraft. Some of the links are on one side of the stack with other links on an opposite side of the stack to provide the accordion configuration. For the sake of discussion the spacecraft can be numbered based on their location in the stack. For the sake of discussion the spacecraft at the top of the stack will be referred to as the first spacecraft. In an embodiment of the accordion configuration, the first and second spacecraft are linked on a first side of the stack, the second and third spacecraft are linked on a second side of the stack, the third and fourth spacecraft are linked on the first side of the stack, the fourth and fifth spacecraft are linked on the second side of the stack, etc. After the tie-down mechanism releases the stack of spacecraft from the launch adaptor the stack unfolds. Initially, the dis-engageable links continue to hold the spacecraft together in the accordion configuration with the angle between each pair of adjacent spacecraft increasing. After a pair of adjacent spacecraft have unfolded a sufficient amount to prevent collision, the dis-engageable links release one of the spacecraft to thereby dispense the spacecraft.

An embodiment of a dis-engageable link has a first position in which the link will engage, link, or otherwise connect two spacecraft together. This embodiment of the dis-engageable link has a second position in which the link will disengage, unlink, release, or otherwise disconnect the two spacecraft from each other. In one embodiment, the dis-engageable link includes a torsion spring that has a first position that engages, links, or otherwise connects two spacecraft together and a second position that disengages, unlinks, releases, or otherwise disconnects two spacecraft from each other. In one embodiment, the dis-engageable link includes a flat tape spring that has a first position that engages, links, or otherwise connects two spacecraft together and a second position that disengages, unlinks, releases, or otherwise disconnects two spacecraft from each other. In one embodiment, the dis-engageable link includes a payload dispensing hinge assembly that has a first position that engages, links, or otherwise connects two spacecraft together and a second position that disengages, unlinks, releases, or otherwise disconnects two spacecraft from each other. An embodiment of the payload dispensing hinge assembly is able to precisely control the angle at which a spacecraft or other payload is dispensed.

An embodiment of the payload dispensing hinge assembly has a first (or upper) hinge-half and a second (or lower) hinge-half that are joined by a hinge pin. The upper hinge-half may be connected to a payload (e.g., upper spacecraft) that is to be dispensed at a target angle. The lower hinge-half may be connected to a payload base (e.g., lower spacecraft). The upper hinge-half may have an upper mounting bracket and a rotatable arm that are shaped to form one or more interlocks that serve to dis-engageably link these two components together. The payload dispensing hinge assembly may have a biasing mechanism that rotates the rotatable arm and hence the upper mounting bracket and payload about a hinge line formed by an axis of the hinge pin. The lower hinge-half has a hinge stop that stops the rotation of the rotatable arm at a target angle, whereby the upper bracket dis-engages from the rotatable arm to dispense the payload at the target angle.

Figure 2:
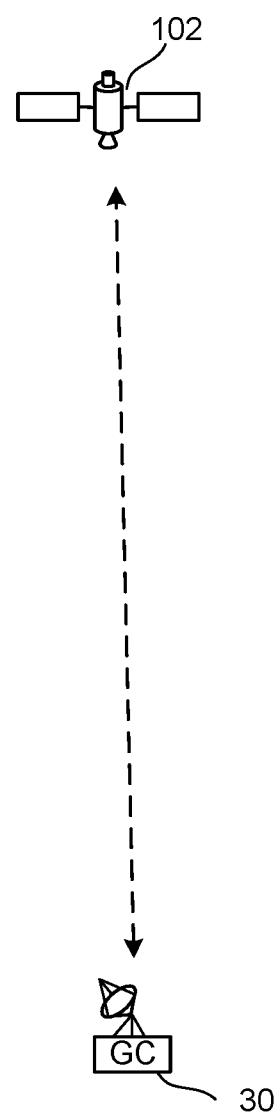
FIG. 2 is a block diagram of a spacecraft system.

FIG. 2 is a block diagram of a spacecraft system. The system of FIG. 2 includes spacecraft 102 and ground control terminal 30. In one embodiment, spacecraft 102 is a satellite; however, spacecraft 102 can be other types of spacecrafts. Spacecraft 102 may be located, for example, at a geostationary or non-geostationary orbital location. Spacecraft 102 can also be a Low Earth Orbit satellite. Technology disclosed herein may be used for dispensing (also referred to as deploying) spacecraft such as spacecraft 102 into orbit. In an embodiment, multiple spacecraft are deployed into orbit using a single launch vehicle.

Ground control terminal 30 is used to monitor and control operations of spacecraft 102. In some embodiments, the ground control terminal 30 may monitor and control operations of a launch vehicle that dispenses the spacecraft 102. Spacecraft can vary greatly in size, structure, usage, and power requirements. In one embodiment, the spacecraft 102 is used as a communication satellite. In some embodiments, the spacecraft 102 has other payloads such as for an optical satellite.

FIG. 3 illustrates an embodiment of a stack of spacecraft 102 in a launch configuration within a fairing 201 of a launch vehicle (launch vehicle not illustrated). The configuration in FIG. 3 may be referred to as a launch configuration. The launch configuration includes a launch adaptor 220 that is mechanically coupled, in the launch configuration, with a primary payload adaptor 230 that may be part of an upper stage (not illustrated) of the launch vehicle. Together the launch adaptor 220 and the primary payload adaptor 230 may be referred to herein as a launch vehicle adaptor. The launch adaptor 220 may also be referred to as payload adaptor faring. In general, the adaptors 220, 230 are used to help carry the load from the multiple spacecraft 102 to the launch vehicle. The adaptors 220, 230 may be formed from a lightweight material such as aluminum, titanium, or graphite.

The stack of spacecraft 102 are held together in the launch configuration by a hold-down assembly. In an embodiment, the hold-down assembly includes a number of hold-down rods 210 and clamp assemblies 208. Each clamp assembly 208 may have a bracket or the like that may be positioned on top of the stack of spacecraft 102 in order to allow the hold-down assembly to apply a downward force on the stack. Each clamp assembly 208 may have other elements such as springs, which may be pre-loaded in the launch configuration. The hold-down assembly secures the stack of spacecraft 102 to the launch adaptor 220. The hold-down rods 210 may be pre-loaded with considerable tension. As one example, the hold-down rods 210 may be pre-loaded at about 100,000 pounds of tension. The hold-down rods 210 may also be referred to as tension rods. The hold-down rods 210 could be formed from, for example, aluminum, titanium or graphite. While FIG. 3 depicts two tension rods 210 there could be more than two tension rods. In one embodiment, there are four tension rods 210. In one embodiment, there are six tension rods 210.

The hold-down assembly is part of a launch restraint and dispensing structure. The tie-hold-down assembly has actuators 224 that are used to release the tension in the tension rods. In one embodiment, the actuators 224 are pneumatic actuators. A pneumatic actuator is a device that converts energy, typically in the form of compressed gas, into mechanical motion. Prior to deploying the spacecraft 102, in one embodiment, the actuators 224 move the tension rods 210 to a deployment configuration to allow the spacecraft 102 to be deployed. There may be one or more push-off springs 242 between the stack and the launch adaptor 220. The push-off springs 242 are compressed when the stack is in the launch configuration. After the tension rods 210 are moved into a deployment position, the push-off springs 242 will push that stack away from the launch adaptor 220. However, the push-off springs 242 are not a requirement.

In an embodiment, a dispensing system is used to hold the stack of spacecraft 102 are held together in an accordion configuration and also to dispense the spacecraft. In an embodiment, the dispensing system has dis-engageable links 240 that connect the stack of spacecraft 102 together in an accordion configuration. An embodiment of a dis-engageable link 240 is capable of engaging, linking, or otherwise connecting two spacecraft together and is also capable of dis-engaging, unlinking, or otherwise disconnecting two spacecraft from each other. Therefore, the dis-engageable links 240 can be used to hold the stack of spacecraft 102 together in the accordion configuration and also to dispense the spacecraft 102. A first set of dis-engageable links 240-1 are depicted on one side of the stack (as solid lined rectangles). There is a second set of dis-engageable links on the opposite side of the stack, which are represented by dashed rectangles labelled 240-2. The links 240 connect adjacent pairs of spacecraft. For example, spacecraft 102(1) and 102(2) are joined by a pair of dis-engageable links 240-1, spacecraft 102(3) and 102(4) are joined by a pair of dis-engageable links 240-1, spacecraft 102(5) and 102(6) are joined by a pair of dis-engageable links 240-1, and spacecraft 102(7) and 102(8) are joined by a pair of dis-engageable links 240-1. A second set of dis-engageable links 240-2 on the opposite side of the stack connect the following adjacent pairs: spacecraft 102(2) with spacecraft 102(3), spacecraft 102(4) with spacecraft 102(5), spacecraft 102(6) with spacecraft 102(7), and spacecraft 102(8) with spacecraft 102(9). This linkage pattern thus forms an accordion configuration. The dispensing system is configured to force the spacecraft apart to unfold the accordion configuration with the spacecraft initially starting connected. However, after the angle between two adjacent spacecraft is great enough the dis-engageable links 240 that connect these two adjacent spacecraft will dis-engage from one of the spacecraft to dispense one of the spacecraft. In an embodiment, each link 240 is configured to disengage (or release, disconnect, etc.) from a first member of a pair of spacecraft to release a second member of the pair of spacecraft after the pair of spacecraft have unfolded a threshold angle.

In an embodiment, a control circuit 222 in the primary payload adaptor 230 controls the tie hold-down assembly. For example, the control circuit 222 may control the actuators 224 that are used to release tension in the tension rods 210. The control circuit 222 may comprise hardware and/or software. The control circuit 222 could include one or more of a processor (e.g., micro-processor), PGA (Programmable Gate Array, FPGA (Field Programmable Gate Array), ASIC (Application Specific Integrated Circuit), integrated circuit or other type of circuit. The control circuit 222 may be located in a different location.

In an embodiment, the spacecraft body has a planar rectangular shape. The spacecraft body, however, is not required to be planar. Moreover, the spacecraft body is not required to be rectangular. In an embodiment, the spacecraft body is relatively short along the z-axis, but relatively long along the x-axis and the y-axis. As one example, the spacecraft body could be a few meters in diameter along the x-axis and the y-axis. As one example, the spacecraft body could be about 8 inches in thickness along the z-axis. However, the spacecraft are not limited to these dimensions. For the sake of discussion, the x-y slice of a spacecraft may be referred to as a major plane. The spacecraft are stacked with the major planes stacked parallel to each other in the example in FIG. 3. Nine spacecraft are depicted in FIG. 3; however, there may be more or fewer than nine. In some cases there could be 30-50 spacecraft in the stack.

Figure 4A:
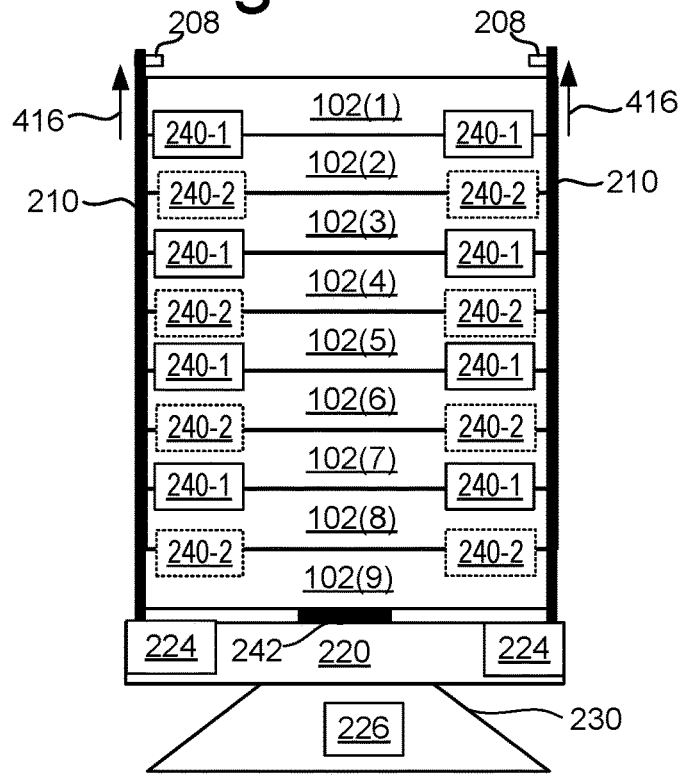
FIG. 4A depicts a stack of spacecraft after tension in the tension rods has been released by actuators.
Figure 4B:
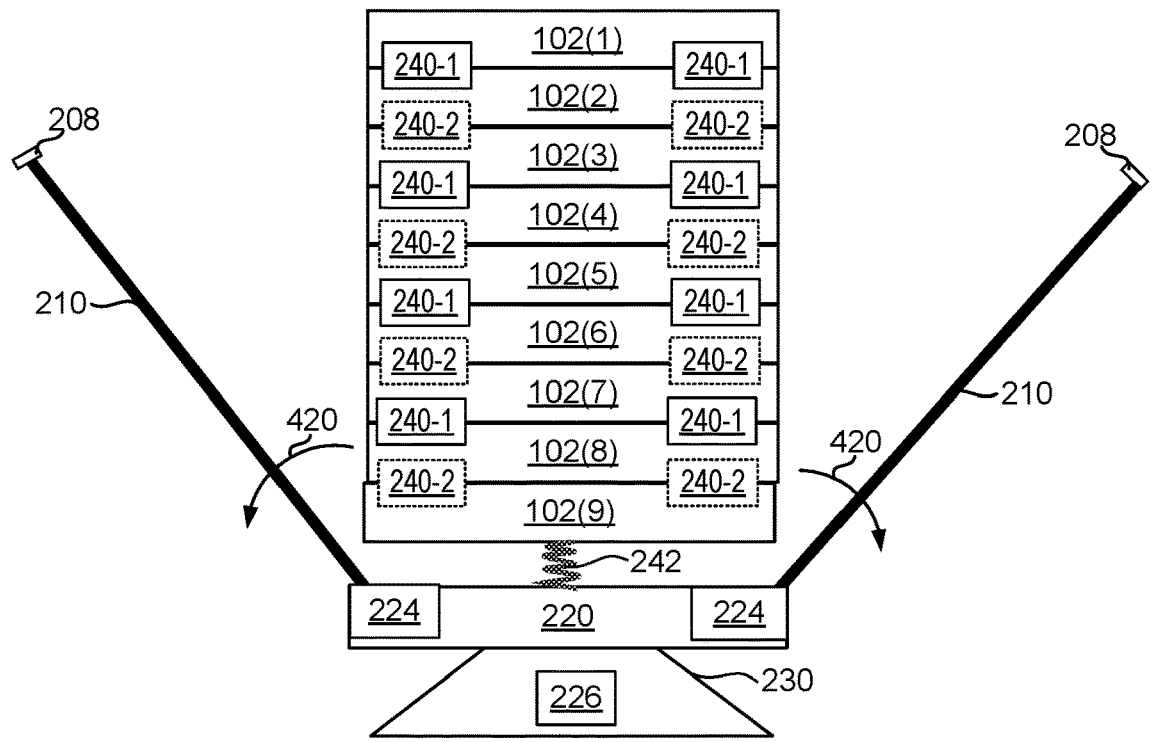
FIG. 4B depicts the stack of spacecraft after the tension rods have been rotated by the actuators into a deployment position.

FIG. 4A depicts a stack of spacecraft 102 after the tension in the tension rods 210 has been released by the actuators 224. Moreover, the top clamp assemblies 208 no longer clamp down the stack due to upward movement (see arrows 416) of the tension rods 210. The actuators 224 may also be used to rotate the tension rods 210 into a deployment position. FIG. 4B depicts the tension rods 210 being rotated (see arrows 420) by the actuators 224 into the deployment position. In one embodiment, the tension rods 210 are rotated about 90 degrees from their original position. The actuators 224 may also be used to prevent the tension rods 210 from bouncing back towards the stack. FIG. 4B shows one of the push-off springs 242 beginning to push the stack away from the launch adaptor 220.

Figure 5:
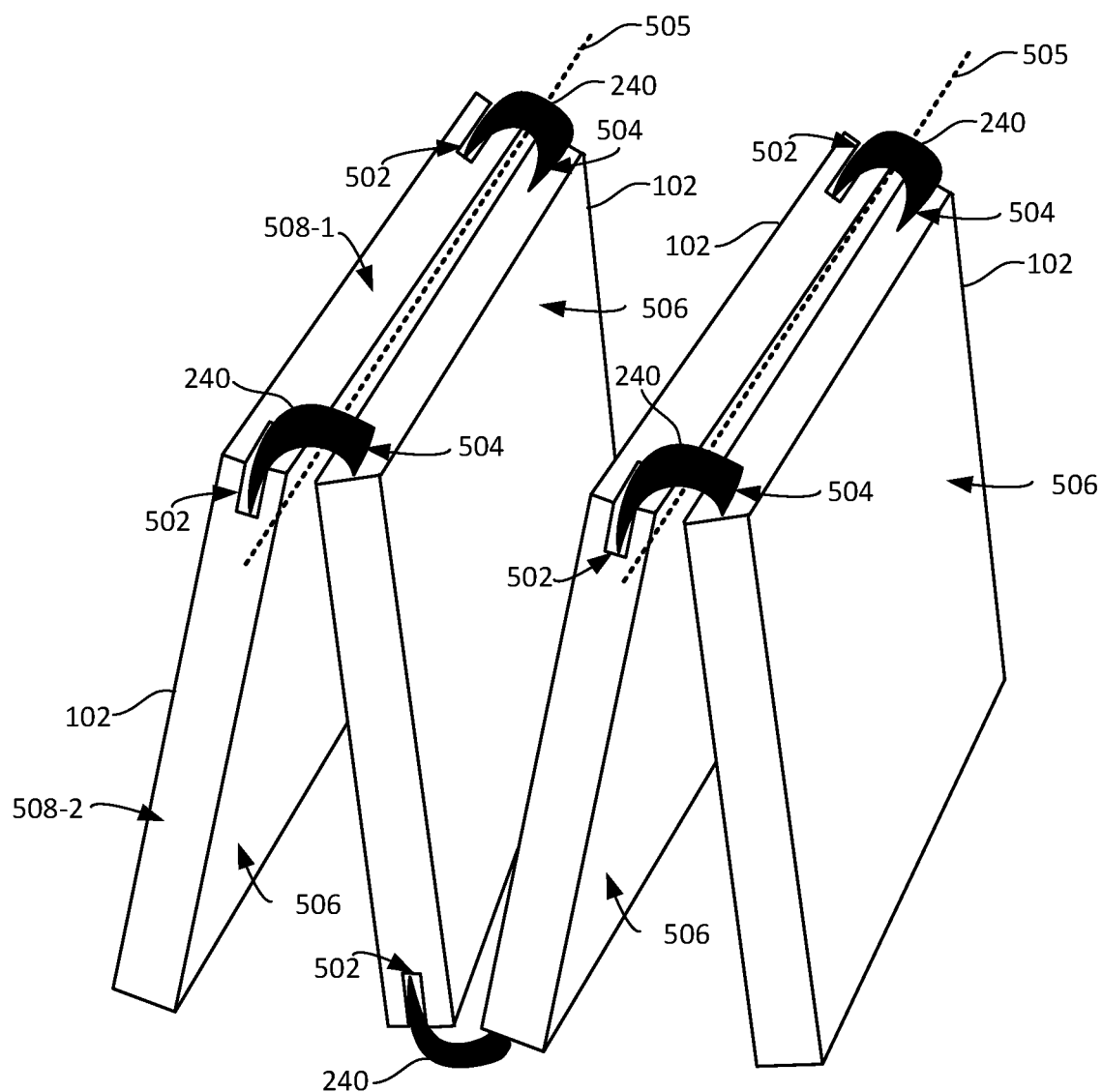
FIG. 5 shows one embodiment of an accordion configuration of spacecraft.

FIG. 5 shows one embodiment of an accordion configuration of spacecraft. In an embodiment in which the spacecraft 102 have a planar rectangular shape, each spacecraft has two major surfaces 506 and four minor surfaces 508. The two major surfaces are on opposite sides of the body of the spacecraft 102. Only one major surface 506 of each spacecraft 102 is visible in FIG. 5. The minor surfaces 508 are between the two major surfaces 506. Two of the minor surfaces 508-1, 508-2 are visible in FIG. 5 for each spacecraft 102. However, the spacecraft 102 are not required to have a rectangular shape.

In an embodiment, each adjacent pair of spacecraft are joined by two dis-engageable links 240. The two links 240 establish a hinge line 505. A link 240 is fixed to a minor surface 508 of one spacecraft at a connection point 504. The other end of the link 240 is engaged in a restraining slot 502 of the spacecraft of the linked pair. As will be explained in greater detail below, when the angle between the adjacent major surfaces 506 of the two adjacent spacecraft is low the links 240 will remain in the restraining slots 502. When the link 240 is bent at a significant angle (as depicted in FIG. 5) the link 240 produces a torque that keeps the link 240 from sliding out of the restraining slots 502. The torque may result in friction between the link 240 and a wall of the restraining slots 502. However, when the accordion configuration expands (or unfolds) the angle between the adjacent major surfaces 506 of the two adjacent spacecraft will increase. When the angle between the adjacent major surfaces 506 of the two adjacent spacecraft is sufficient to avoid spacecraft bumping into another the link 240 will slide out of the restraining slot 502 thereby dispensing one spacecraft of the adjacent pair. In one embodiment, the amount torque produced by the link 240 will decrease as the spacecraft unfold with the link 240 eventually sliding out of the restraining slot 502.

Figure 6A:
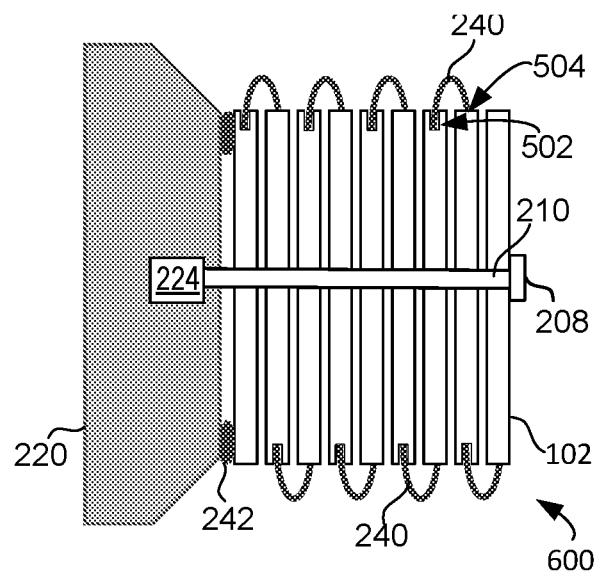

FIGS. 6A-6D depict one embodiment of a system for dispensing a stack of spacecraft. FIG. 6A depicts a stack 600 of spacecraft 102 are held to a launch adaptor 220 by a -down and release mechanism. The tie-down and release mechanism has a tension rod 210, top clamp 208, and actuators 224 There will typically be additional tension rods and clamps but those are not depicted in FIG. 6A. The spacecraft 102 are held together in an accordion configuration by a number of dis-engageable links 240. In an embodiment, each link 240 comprises a torsion spring. In an embodiment, the torsion spring is a flat tape spring. Each link 240 is connected to one spacecraft at a connection point 504. The torsion springs are bent at a considerable angle in the configuration of FIG. 6A. Therefore, there is considerable torque to hold the torsion springs into the restraining slots 502. In an embodiment, the torsion spring is made of steel, but a different material could be used.

Figure 6B:
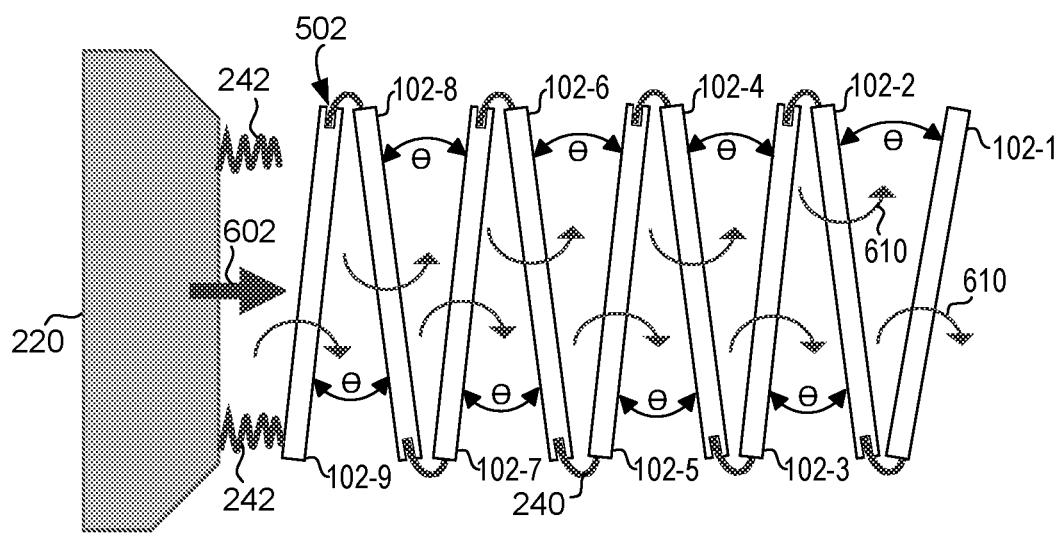

FIG. 6B depicts the initial dispensing of the spacecraft 102 after the tension rods 210 have been moved to a deployment position. An example of moving the tension rods 210 to the deployment position was discussed with reference to FIGS. 4A-4B. The tension rods are not depicted in FIG. 6B so as to not obscure the diagram. Springs 242 that are attached to the launch vehicle adaptor 220 push the stack 600 of spacecraft 102 away from the launch vehicle adaptor 220. Arrow 602 represents the force from the springs 242. However, the springs are not required. The spacecraft 102 are still linked together by the links 240 in the according configuration. However, the according configuration is beginning to unfold with the angle ($\ominus$) between adjacent major surfaces of each adjacent pair of spacecraft increasing. In an embodiment, the links 240 provide a torque that causes the unfolding. The angle ($\ominus$) is not required to be the same for each adjacent pair of spacecraft. Thus, the unfolding could occur at different rates for different adjacent pairs of spacecraft, wherein the angle ($\ominus$) may be different for different adjacent pairs of spacecraft. As noted the links may be or may include torsion springs. Herein, a torsion spring is defined as a spring that exerts an amount of torque that is proportional to the angle at which the torsion spring is bent. The amount to which the torsion spring is bent depends on the angle ($\ominus$) between two adjacent spacecraft. In an embodiment, the maximum torque occurs when the angle between two adjacent spacecraft is about 0 degrees and the minimum torque occurs when the angle between two adjacent spacecraft is about 180 degrees. In an embodiment, the torsion spring will slide out of the restraining slot 502 when the angle ($\ominus$) between two adjacent spacecraft is about 90 degrees. However, this angle could vary such that the torsion spring may, in some embodiments, slide out of the restraining slot 502 when the angle ($\ominus$) between two adjacent spacecraft is between about 60 degrees to 120 degrees. In some embodiments, the torsion spring may slide out of the restraining slot 502 when the angle (Θ) between two adjacent spacecraft is between about 75 degrees to 105 degrees. In some embodiments, the torsion spring may slide out of the restraining slot 502 when the angle (Θ) between two adjacent spacecraft is between about 45 degrees to 135 degrees.

FIG. 6B shows a rotation arrow 610 for each spacecraft 102, which indicates a direction in which that spacecraft 102 is beginning to rotate as a consequence of the unfolding of the accordion configuration. Spacecraft 102-1, 102-3, 102-5, 102-7, and 102-9 are beginning to rotate in the clockwise direction. Spacecraft 102-2, 102-4, 102-6, and 102-8 are beginning to rotate in the counter-clockwise direction. Thus, note that in this example each spacecraft 102 will rotate in the opposite direction as its immediate neighbor on each side. In an embodiment, this opposite direction of rotation helps to prevent collision (or bumping) between spacecraft 102 after dispensing the spacecraft. Note that at the stage depicted in FIG. 6B, all spacecraft 102 are still connected together which prevents any bumping or collisions between the spacecraft 102.

FIG. 6C depicts a later stage of dispensing of the spacecraft 102 in which the angle ( ) has increased relative to FIG. 6B. The links 240 still connect spacecrafts 102-2-102-9 in the accordion configuration. However, spacecraft 102-1 has been dispensed due to the link 240-1 dis-engaging from spacecraft 102-2 (as well as any other links 240 that connected spacecraft 102-1 with spacecraft 102-2). In an embodiment, there are two links 240 that connect each spacecraft (see FIG. 5). However, only one such link 240 is depicted in FIG. 6C. The links 240 between spacecraft 102-1 and 102-2 disengage (or release, disconnect, etc.) from spacecraft 102-2 due to the angle (Θ) reaching a sufficient amount. In an embodiment, the links 240 will slide out of restraining slots 502 due to a reduction in friction between the link 240 and sidewall of restraining slot 502. This reduction of friction may result from the reduction in torque from the link 240 (e.g., torsion spring) as the accordion configuration unfolds. In some embodiments, dispensing a spacecraft at a target angle will assure that there is not a collision between the dispenses spacecraft and any other spacecraft. Therefore, links 240 that connect a particular pair of adjacent spacecraft 102 are configured to break the connection between a first member of the particular pair and a second member of the particular pair after the particular pair have unfolded a threshold angle to dispense the second member.

FIG. 6D depicts a still later stage of dispensing the spacecraft 102. Spacecraft 102-2 and 102-3 have been dispensed. The spacecraft 102 continue to rotate in the directions previously discussed. Directional arrows 620 show the directions in which the center of mass of each respective spacecraft 102-1, 102-2, 102-3 are traveling after being dispensed. Note that none of the spacecraft 102 bump into each other. Therefore, structural damage to the spacecraft 102 is prevented. Moreover, the performance of the spacecraft 102 is not degraded. The order in which the spacecraft 102 are dispensed need not be the same as depicted in FIGS. 6C and 6D. A spacecraft that is closer to the launch adaptor 220 could be dispensed prior to one further from the launch adaptor 220. For example, spacecraft 102-9 could be dispensed prior to spacecraft 102-4.

Figure 7A:
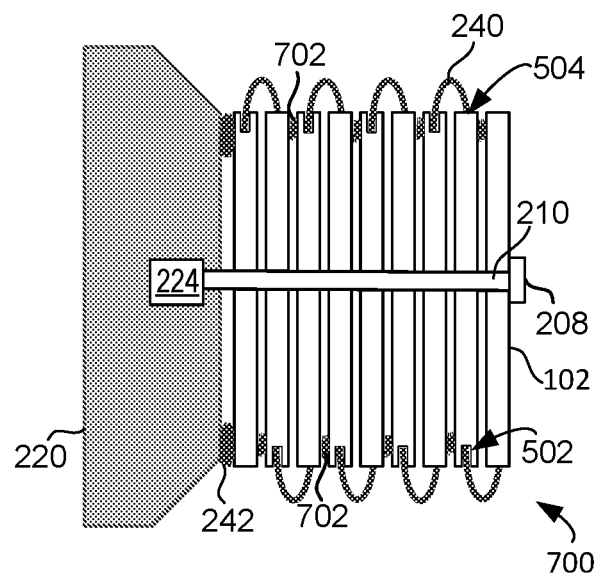

As noted in the discussion of FIGS. 6A-6D the links 240 may provide a torque that causes the spacecraft to separate. However, it is not required that the links 240 provide sufficient torque to cause the spacecraft to separate. FIGS. 7A-7D depict one embodiment of dispensing a stack of spacecraft in which there are push-off springs 702 between the adjacent major surfaces of spacecraft 102. In an embodiment, the push-off springs 702 provide a force to unfold the accordion configuration. In one embodiment, the push-off springs 702 are linear springs. FIG. 7A depicts a configuration that is similar to FIG. 6A, but adds the push-off springs 702. In an embodiment, the links 240 are flat flexible straps. Similar to the flat tape springs, the flat flexible strap may be fixed to a first member of an adjacent pair of spacecraft and slideably connected in a restraining slot of a second member of the adjacent pair. However, the push-off springs 702 may optionally be used in an embodiment with flat tape (or torsion) springs. Herein, the phrase "a link (or similar element) is slideably connected in a restraining slot" means that for lower angles between the two spacecraft the link will remain fixed in the slot, but when the angle between the two spacecraft reaches a sufficient angle the link will slide out of the restraining slot.

Figure 7B:
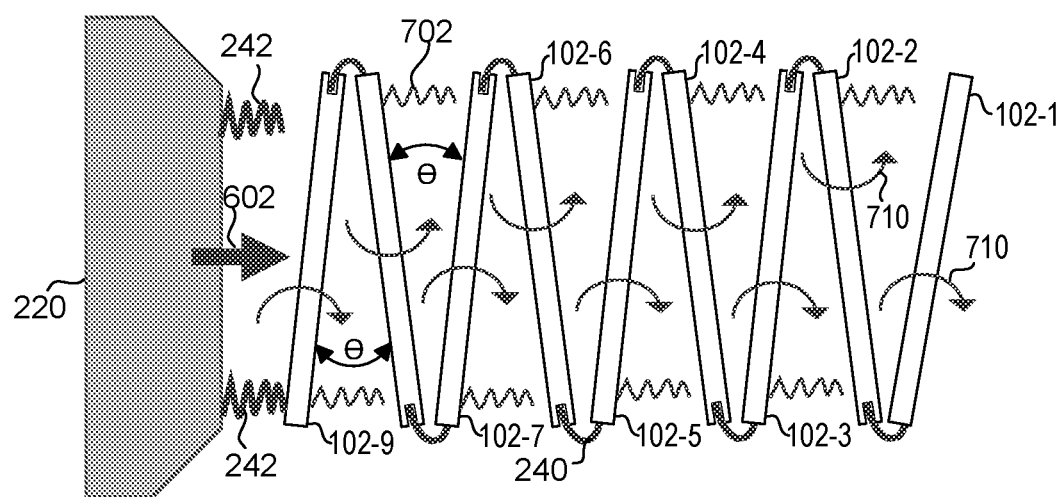

FIG. 7B depicts the initial dispensing of the spacecraft 102 after the tension rods 210 have been moved to a deployment position. The springs 242 that are attached to the launch vehicle adaptor 220 push the stack 700 of spacecraft 102 away from the launch vehicle adaptor 220. Arrow 602 represents the force from the springs 242. However, springs 242 are not required. The spacecraft 102 are still linked together by the links 240 in the according configuration. However, the according configuration is beginning to unfold with the angle (Θ) between adjacent major surfaces of each adjacent pair of spacecraft increasing. In an embodiment, the push-off springs 702 provide a torque that causes the unfolding. The angle of rotation 710 of the spacecraft may be similar to the example in FIG. 6B.

FIG. 7C depicts a later stage of dispensing of the spacecraft in which the angle (Θ) is (relative to FIG. 7B). The links 240 still connect spacecrafts 102-2-102-9 in the accordion configuration. However, spacecraft 102-1 has been dispensed due to the link 240 (*a*) dis-engaging from spacecraft 102-2 (as well as any other links that connected spacecraft 102-1 with spacecraft 102-2). In an embodiment, there are two links 240 that connect each spacecraft (see FIG. 5). However, only one such link 240 is depicted in FIG. 7C. The links 240 between spacecraft 102-1 and 102-2 disengage from spacecraft 102-2 due to the angle (Θ) reaching a sufficient amount. Therefore, links 240 that connect a particular pair of adjacent spacecraft 102 are configured to break the connection between a first member of the particular pair and a second member of the particular pair after the particular pair have unfolded a threshold angle to dispense the second member. In one embodiment, the links 240 will disengage when the angle (Θ) between the adjacent major surfaces reaches approximately 90 degrees. In one embodiment, the links 240 will disengage when the angle (Θ) between the adjacent major surfaces reaches a range of between approximately 75 to 105 degrees. In one embodiment, the links 240 will disengage when the angle (O) between the adjacent major surfaces reaches a range of between approximately 60 to 120 degrees. In some embodiments, dispensing a spacecraft at a target angle will assure that there is not a collision between the dispenses spacecraft and any other spacecraft.

FIG. 7D depicts a still later stage of dispensing the spacecraft 102. In addition to link 240 (*a*), link 240 (*b*) and link 240-(*c*) have each dis-engaged. Therefore, spacecraft 102-2 and 102-9 have been dispensed. The spacecraft 102 continue to rotate in the directions previously discussed. Directional arrows 620 show the directions in which the center of mass of each respective spacecraft 102-1 and 102-2, are traveling after being dispensed. Note that none of the spacecraft 102 bump into each other. Therefore, structural damage to the spacecraft 102 is prevented. Moreover, the performance of the spacecraft 102 is not degraded. The order in which the spacecraft 102 are dispensed need not be the same as depicted in FIGS. 7C and 7D.

Figure 8:
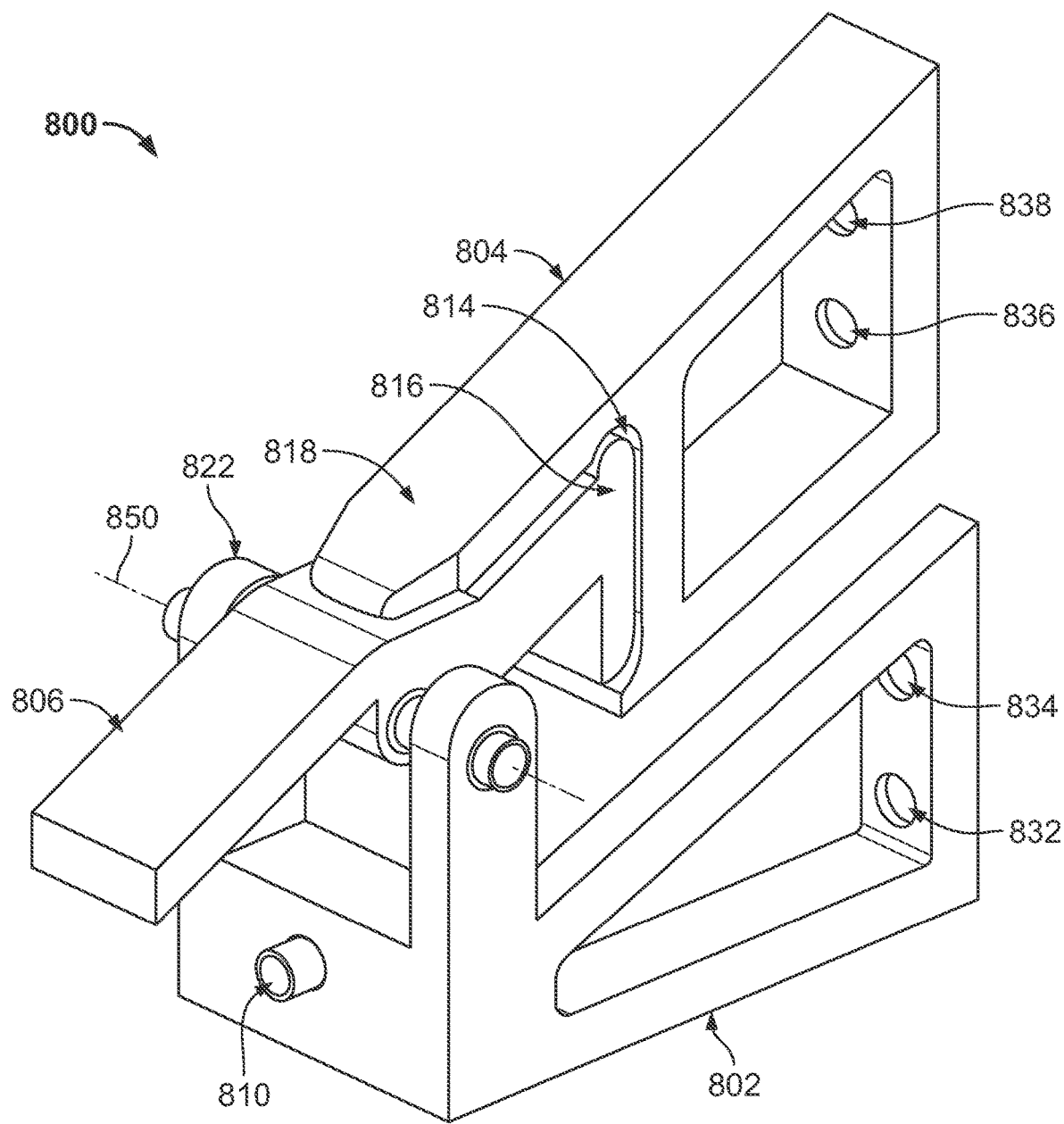
FIG. 8 is a perspective view of one embodiment of the payload dispensing hinge assembly.

FIG. 8 is a perspective view of one embodiment of the payload dispensing hinge assembly 800 (more briefly "hinge assembly"). In one embodiment, the hinge assembly 800 is used for a dis-engageable link 240. Thus, the hinge assembly 800 may be used to dispense a stack of spacecraft that are connected by hinge assemblies 800 in an accordion configuration. However, the hinge assembly 800 has a wide range of applications in deploying a payload into space. The hinge assembly 800 allows a payload (e.g., spacecraft) to be dispensed at a target angle. Thus, a set of hinge assemblies 800 may be used to precisely control the dispensing angle between adjacent planar spacecraft. The payload (e.g., spacecraft) is not depicted in FIG. 8.

The hinge assembly 800 includes a first (or upper) hinge-half and a second (or lower) hinge-half that are joined by a hinge pin. The upper hinge-half may be connected to a payload that is to be deployed. The lower hinge-half may be connected to a payload base. In an embodiment, both the payload and the payload base are spacecraft. However, the payload is not required to be a spacecraft. In an embodiment, the payload is some type of instrument that is deployed into space. Likewise, the payload base is not required to be a spacecraft.

The lower hinge-half has a lower mounting bracket 802 (or "lower bracket") that may be mounted (or attached) to the payload base (e.g., lower spacecraft). The upper hinge-half has an upper mounting bracket 804 (or "upper bracket") that may be attached to the payload (e.g., upper spacecraft). The upper hinge-half also has a rotatable arm 806. Openings 832, 834 in the lower bracket 802 allow the lower bracket 802 to be fixed to a payload base (e.g., lower spacecraft). Openings 836, 838 in the upper bracket 804 allow the upper mounting bracket 804 to be fixed to a payload (e.g., upper spacecraft). A hinge line 850 is depicted along a central axis of a hinge pin 822.

The rotatable arm 806 and upper mounting bracket 804 are shaped to lock together. In an embodiment, the rotatable arm 806 and upper mounting bracket 804 have one or more interlocks that serve to lock the two components (804, 806) together. In an embodiment, the rotatable arm 806 and upper mounting bracket 804 have two or more interlocks that serve to lock the two components (804, 806) together. In an embodiment depicted in FIG. 8, the rotatable arm 806 has a tongue 816 that locks into groove 814 in the upper bracket 804; however, other shapes may be used. In an embodiment, tongue 816 and groove 814 function as a first interlock. The upper bracket 804 has a tip (e.g., pivot point) 818 that fits into a pivot cavity in the rotatable arm 806, although the pivot cavity is obscured by the tip 818 in FIG. 8. In an embodiment, tip 818 and pivot cavity function a second interlock. In an embodiment, the first interlock is configured to constrain the two components (804, 806) in one or more degrees of freedom. In an embodiment, the second interlock is configured to constrain the two components (804, 806) in one or more degrees of freedom. In an embodiment, the first interlock and the second interlock function together such that together the two interlocks constrain the two components (804, 806) in six degrees of freedom.

The hinge assembly 800 has a hinge pin 822 that joins together the rotatable arm 806 and lower bracket 802. The lower hinge-half has a hinge stop 810 that may extend out of the body of the lower bracket 802. In an embodiment, the hinge stop 810 is part of a hinge stop mechanism that screws into the body of the lower bracket 802 such that the amount by which the hinge stop 810 extends out of the lower bracket 802 may be adjusted by the hinge stop mechanism. The upper hinge-half may rotate with respect to the lower hinge-half. In an embodiment, the rotatable arm 806 is spring driven in order rotate the rotatable arm 806 and hence the upper bracket 804. A torsion spring 860 has coils around the hinge pin 822 and arms that extend to the rotatable arm 806 and the lower bracket 802. In an embodiment, the payload is released after the upper hinge-half has rotated a target number of degrees with respect to the lower hinge-half.

Figure 9:
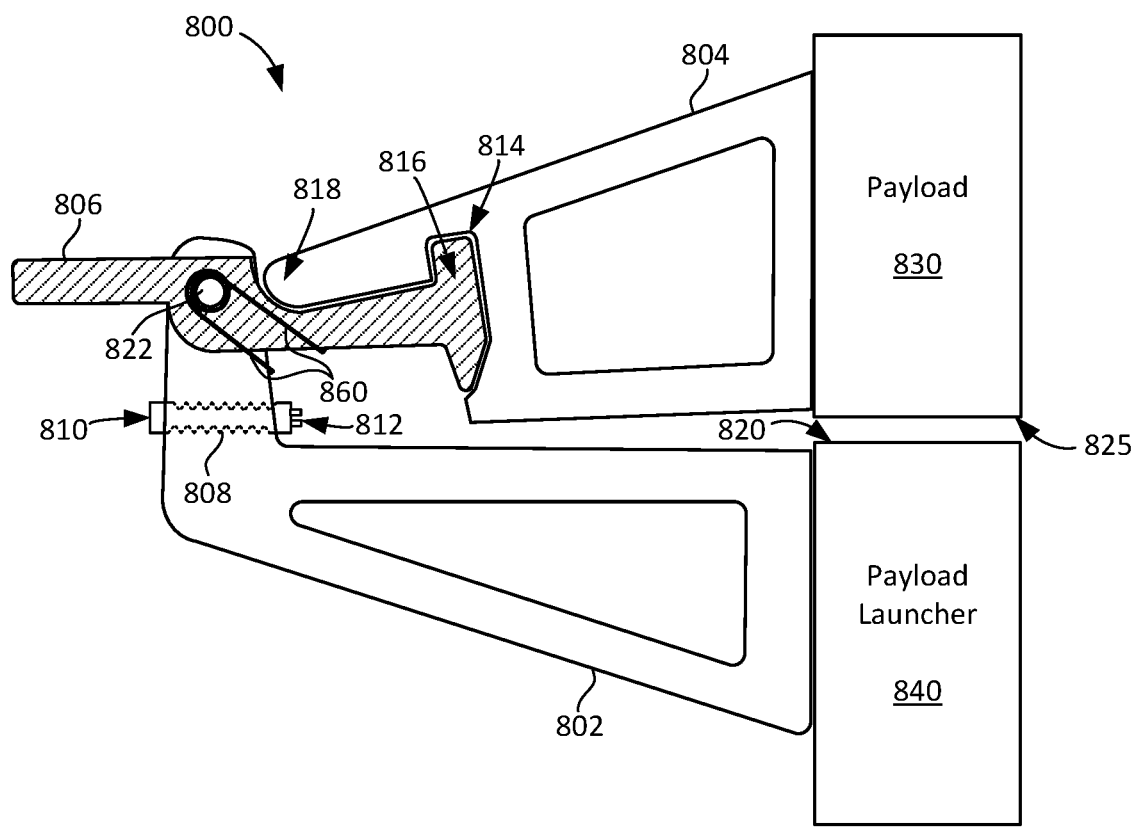
FIG. 9 depicts a cross-sectional view of one embodiment of the payload dispensing hinge assembly.

FIG. 9 depicts a cross-sectional view of one embodiment of the hinge assembly 800. FIG. 9 contains reference numerals that appear in FIG. 8 such that the discussion of FIG. 8 pertains also to FIG. 9. The upper bracket 804 is attached to a payload 830 that is to be deployed. The lower bracket 802 is attached to a payload base 840. Note only a portion of the payload base 840 and the payload 830 is depicted in FIG. 9. The major surfaces 820, 825 may extend much further. In an embodiment, the payload dispensing hinge assembly may be used to deploy the payload 830 when the major surface 825 of the payload 830 is at a target angle to the major surface 820 of the payload base. In an embodiment, both the payload 830 and the payload base 840 are spacecraft. However, the payload 830 is not required to be a spacecraft. In an embodiment, the payload 830 is some type of instrument that is deployed into space. Likewise, the payload base 840 is not required to be a spacecraft. A hinge stop mechanism 808 screws into the body of the lower bracket 802 such that the amount by which the hinge stop 810 extends out of the lower bracket 802 may be adjusted by the hinge stop mechanism. In one embodiment, a head 812 of the hinge stop mechanism 808 may be rotated clockwise or counterclockwise to adjust the hinge stop 810 to thereby precisely control the dispensing angle.

Figure 10:
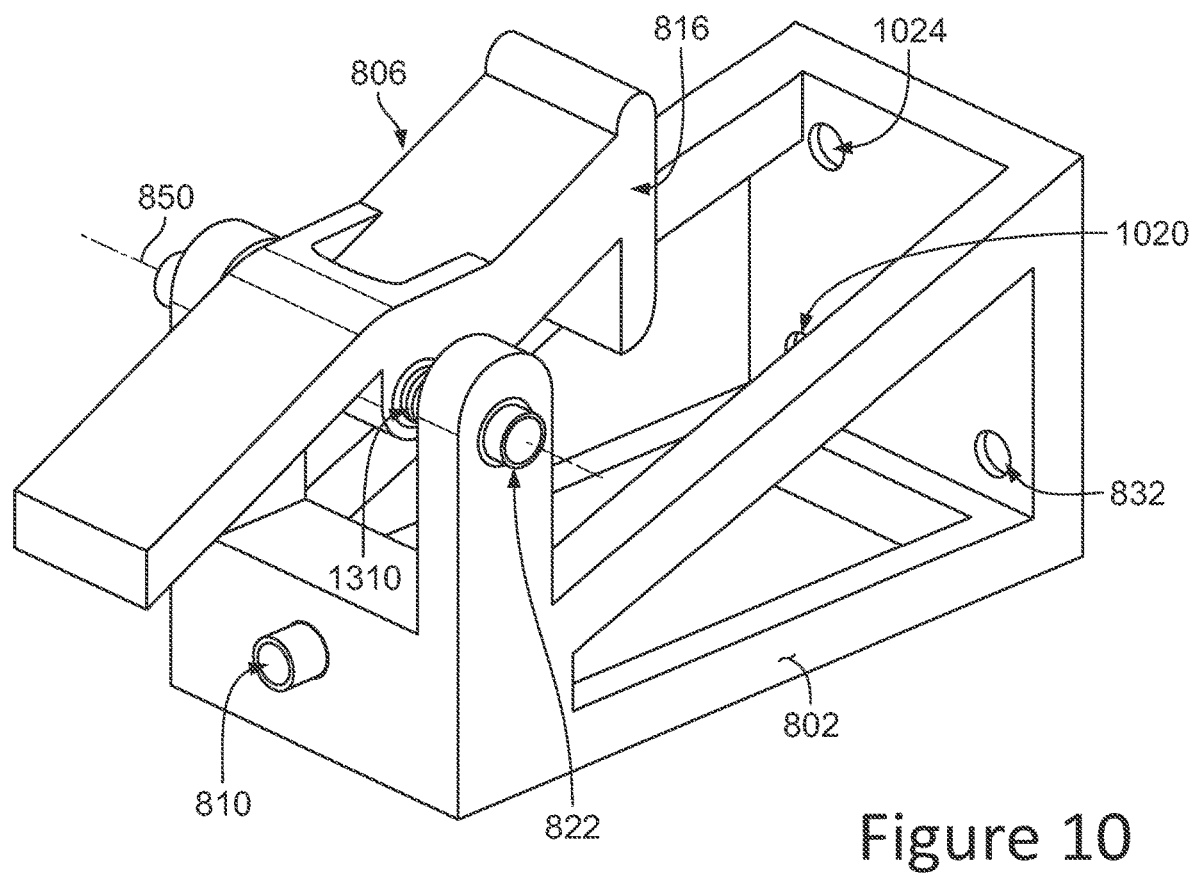
FIG. 10 is a perspective view of one embodiment of the hinge assembly without an upper bracket.

FIGS. 10-13 depict perspective views of various components of an embodiment of the hinge assembly 800. FIGS. 10-13 contains reference numerals that appear in FIG. 8 such that the discussion of FIG. 8 pertains also to FIGS. 10-13. FIG. 10 is a perspective view of one embodiment of the hinge assembly 800 without the upper bracket 804. Some additional openings 1020, 1024 in the body of the lower mounting bracket 802 can be seen. Openings 1020, 1024 along with openings 832, 834 may be used for fixing the payload base (e.g., lower spacecraft) to the lower mounting bracket 802. A portion of a biasing mechanism 1310 is depicted. The biasing mechanism provides torque (e.g., rotational torque) to rotate the rotatable arm 806 around the hinge line 850. In one embodiment, the biasing mechanism includes a pivot torsion spring. The pivot torsion spring may have coils 1310 around the hinge pin 822. The biasing mechanism (e.g., pivot torsion spring) may be one piece or may have multiple pieces. For example, the pivot torsion spring could be two pieces with each piece on one side of the hinge pin 822. In one embodiment, a leaf spring is used instead of a torsion spring.

Figure 11:
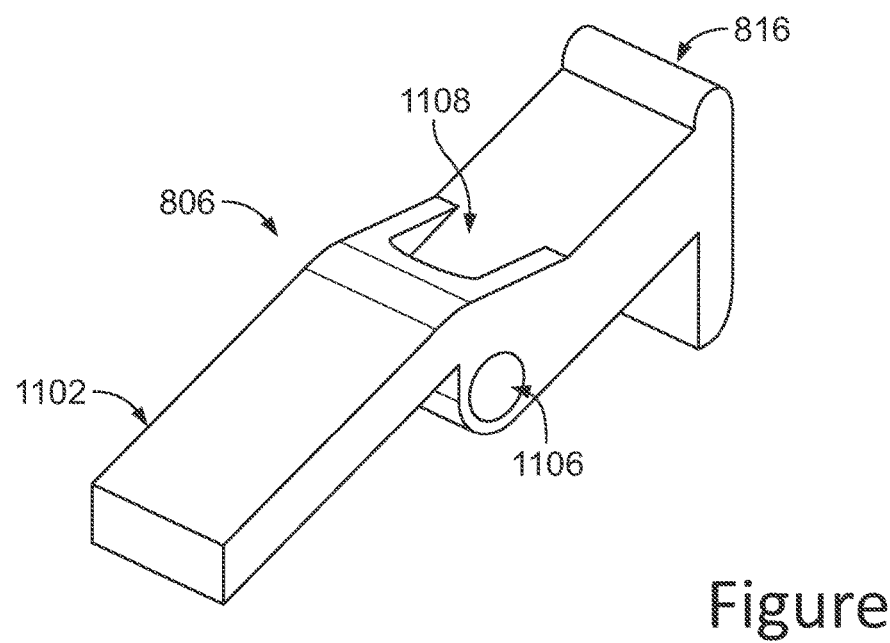
FIG. 11 is a perspective view of one embodiment of a rotatable arm of the payload dispensing hinge assembly.

FIG. 11 is a perspective view of one embodiment of the rotatable arm 806. One end of the rotatable arm 806 serves as a pivot stop 1102. Another end of the rotatable arm 806 serves as part of the tongue 816 to dis-engageably connect (or releasably connect) the rotatable arm 806 with the upper bracket 804. Opening 1106 is shaped to receive the hinge pin 822 to allow the rotatable arm 806 to rotate about the hinge line 850. The pivot cavity 1108 is shaped to receive the tip (or pivot point) of the upper bracket 804.

Figure 12:
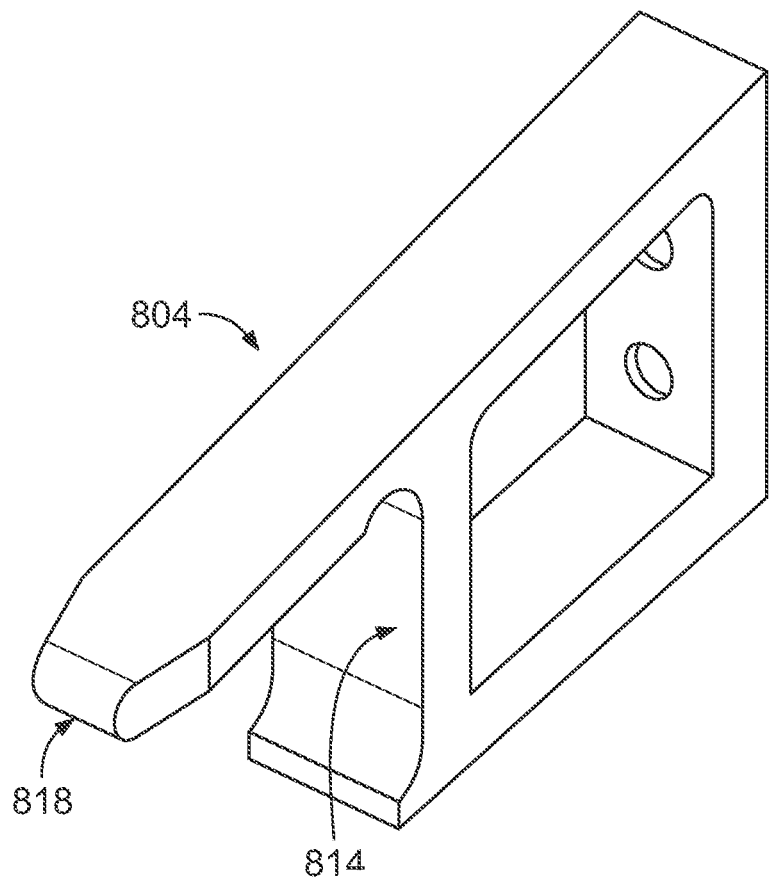
FIG. 12 is a perspective view of one embodiment of the upper bracket of the payload dispensing hinge assembly.

FIG. 12 is a perspective view of one embodiment of the upper bracket 804. The upper bracket 804 has a groove 814 that is shaped to lock with the tongue (see 816 in FIG. 8, 9, 10, or 11) of the rotatable arm 806. The upper bracket 804 has tip 818. The tip 818 pivots in the pivot cavity (see 1108 in FIG. 11) of the rotatable arm 806 after the upper bracket 804 disengages (or release, disconnect, etc.) from the rotatable arm 806. Also, the tip 818 may serve as a part of the interlock mechanism that holds the rotatable arm 806 and the upper bracket 804 together.

Figure 13:
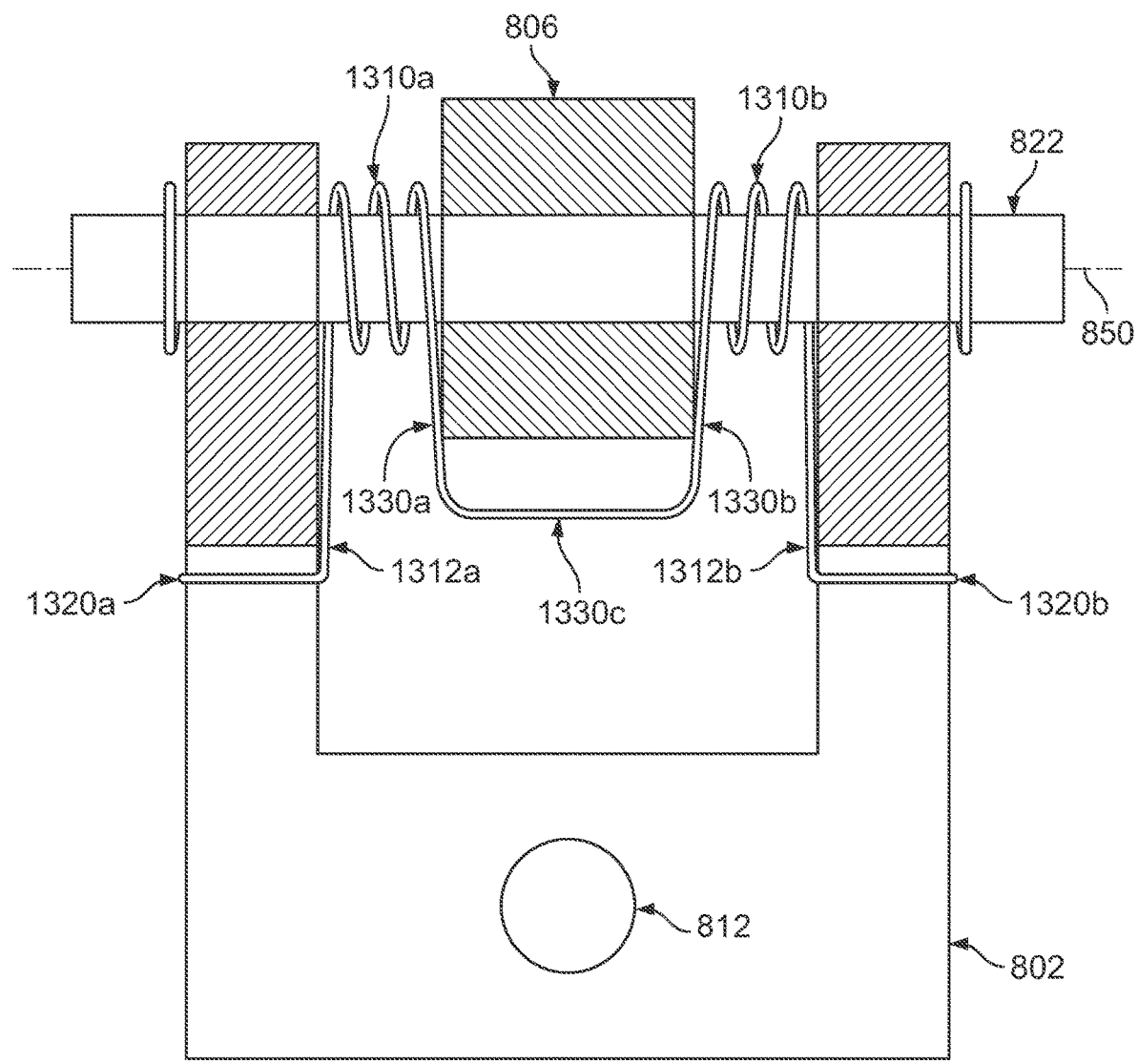
FIG. 13 is a perspective view of one embodiment of a combination of the lower bracket and rotatable arm of the payload dispensing hinge assembly.

FIG. 13 is a perspective view of one embodiment of a combination of the lower bracket 802 and rotatable arm 806. An embodiment of the biasing mechanism is also depicted. The biasing mechanism in FIG. 13 includes a pivot torsion spring. The pivot torsion spring has a first set of coils 1310a and a second set of coils 1310b that each surround the hinge pin 822. The pivot torsion spring has a first outer leg 1312a that extends from the first set of coils 1310a. The end of the first outer leg 1312a is bent at about 90 degrees to form a first prong 1320a that engages with the body of the lower bracket 802. The pivot torsion spring has a second outer leg 1312b that extends from the second set of coils 1310b. The end of the second outer leg 1312b is bent at about 90 degrees to form a second prong 1320b that engages with the body of the lower bracket 802. The pivot torsion spring has a first inner leg 1330a that extends from the first set of coils 1310a and a second inner leg 1330b that extends from the second set of coils 1310b. The first inner leg 1330a and second inner leg 1330b are connected by middle leg 1330c. The middle leg 1330c engages with the rotatable arm 806. Therefore, the pivot torsion spring provides a torque to rotate the rotatable arm 806 around the hinge line 850.

FIGS. 14A-14D depict various stages of one embodiment of a hinge assembly 800 deploying a payload. Each of these drawings depicts a cross-sectional view of one embodiment of a hinge assembly 800 consistent with an embodiment of FIG. 9. FIG. 9, discussed above, shows the initial configuration in which the angle between the major surface 820 of the payload base 840 a major surface 825 of the payload 830 is about 0 degrees. Note only a portion of the payload base 840 and the payload 830 is depicted in FIG. 9. The major surfaces 820. 825 may extend much further. In an embodiment, the payload dispensing hinge assembly may be used to deploy the payload 830 when the major surface 825 of the payload 830 is at a target angle to the major surface 820 of the payload base.

As noted above, the lower hinge-half has a lower mounting bracket 802 (or "lower bracket") that is attached to the payload base 840. The upper hinge-half has an upper mounting bracket 804 (or "upper bracket") that is attached to the payload 830. The upper hinge-half also has a rotatable arm 806. The rotatable arm 806 and upper mounting bracket 804 are shaped to lock together. The upper hinge-half may rotate with respect to the lower hinge-half. In an embodiment, the rotatable arm 806 is spring driven in order rotate the rotatable arm 806 and hence the upper bracket 804. In the example in FIGS. 14A-14D, the upper hinge-half rotates counter-clockwise with respect to the lower hinge-half. In an embodiment, the payload 830 is released after the upper hinge-half has rotated a target number of degrees with respect to the lower hinge-half.

Figure 14A:
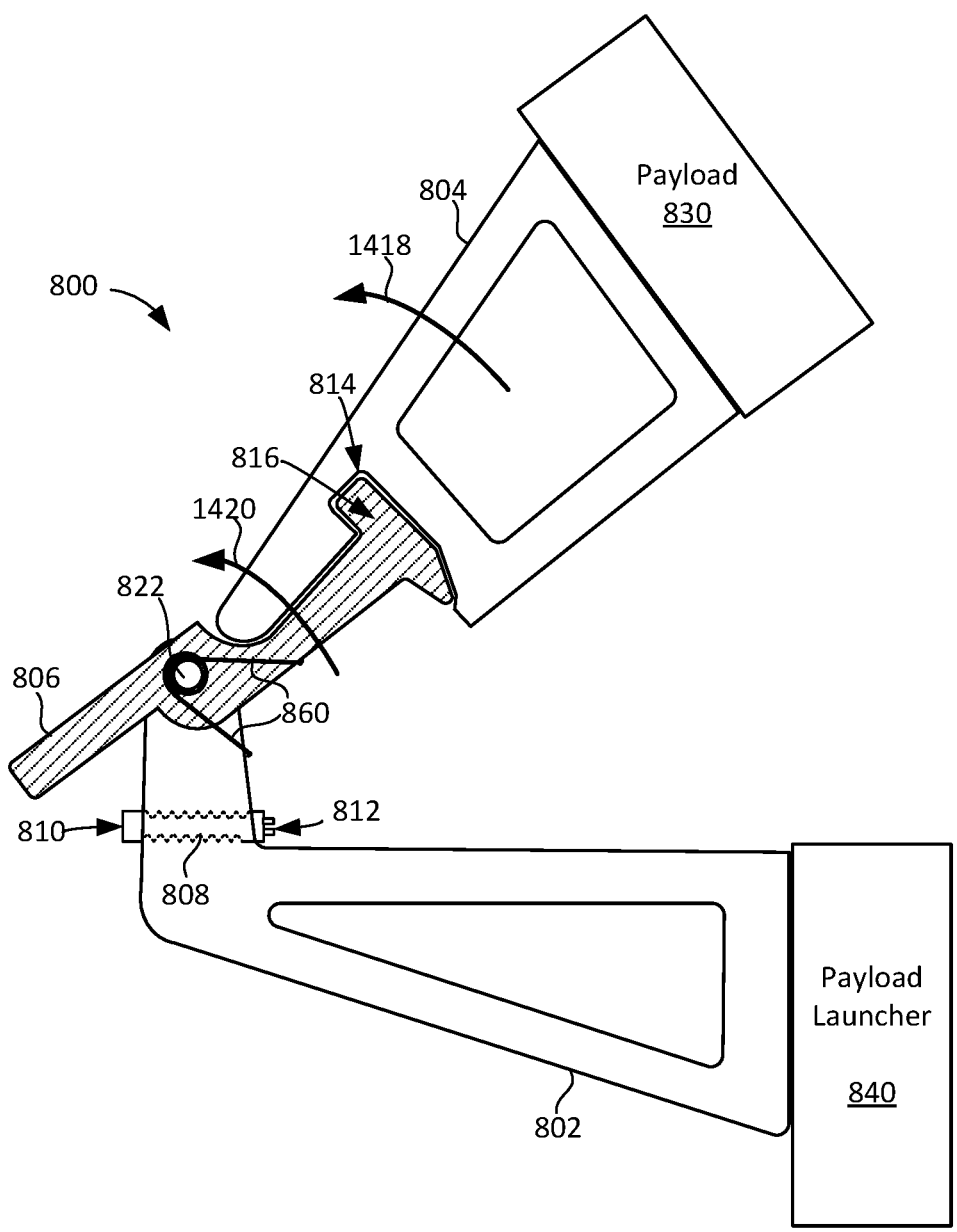
FIGS. 14A, 14B, 14C, and 14D depict dispensing a payload with an embodiment of the payload dispensing hinge assembly.

FIG. 14A depicts the initial separation between the payload 830 and payload base 840. For the sake of discussion the lower hinge-half will be referred to as stationary and the upper hinge-half will be referred to as rotating about the binge pin 822. Note that rotating about the hinge pin 822 may also be referred to as rotating about the hinge line (see hinge line 850 in FIGS. 8 and 13). Arrow 1418 shows the rotations of the upper bracket 804 and arrow 1420 shows the rotation of the rotatable arm 806. The upper bracket 804 and rotatable arm 806 will initially rotate together due to these two components (804, 806) being locked together.

Figure 14B:
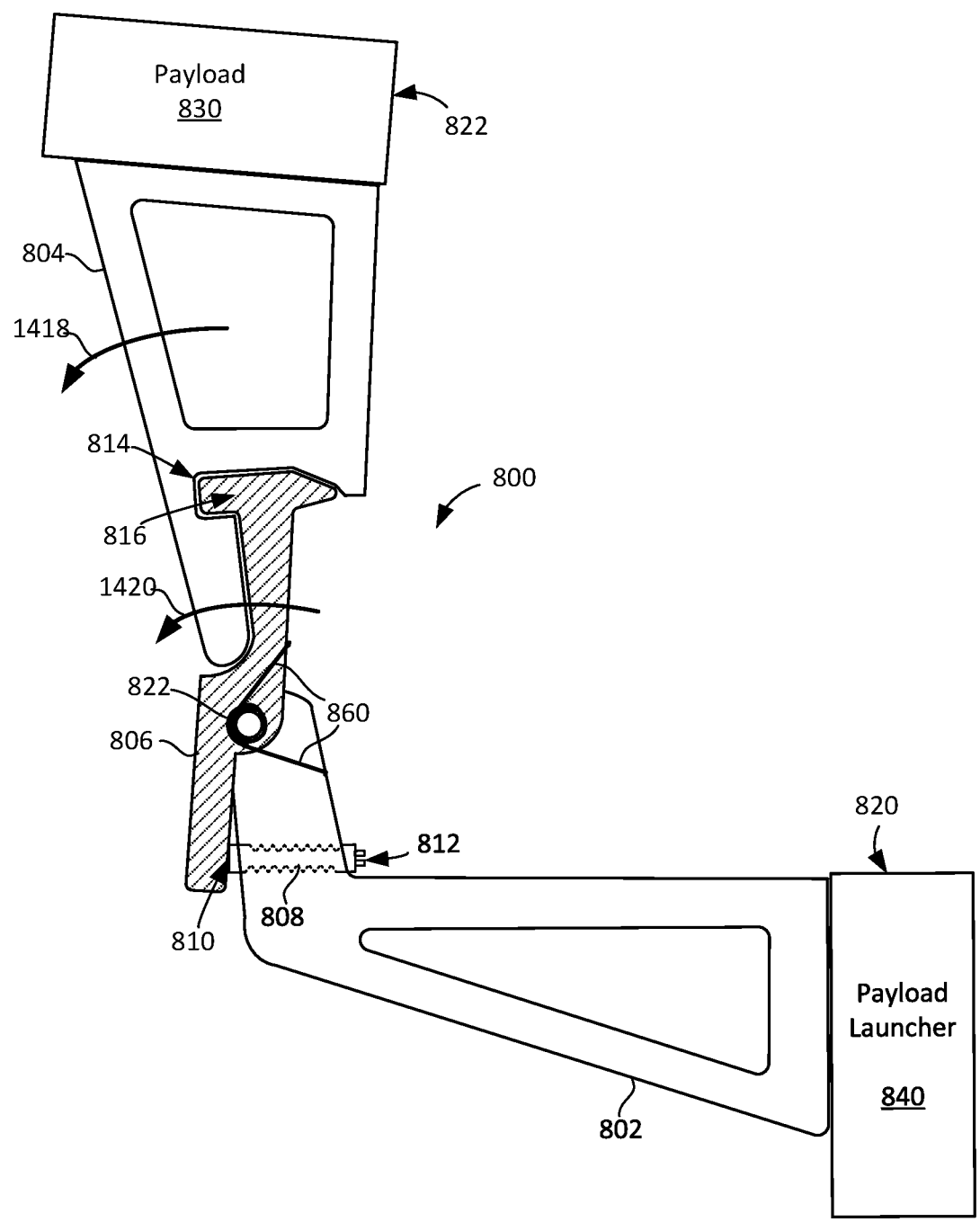

FIG. 14B depicts further separation between the payload 830 and payload base 840. The rotatable arm 806 has just come into contact with the hinge stop 810. The angle between the two major surfaces 820, 825 is now at about 90 degrees. In an embodiment the hinge stop 810 can be adjusted to control the angle between the two major surfaces 820 when the rotatable arm 806 just comes into contact with the hinge stop 810. In an embodiment, the hinge stop 810 can be adjusted to control the number of degrees that the upper hinge-half rotates with respect to the lower hinge-half.

Figure 14C:
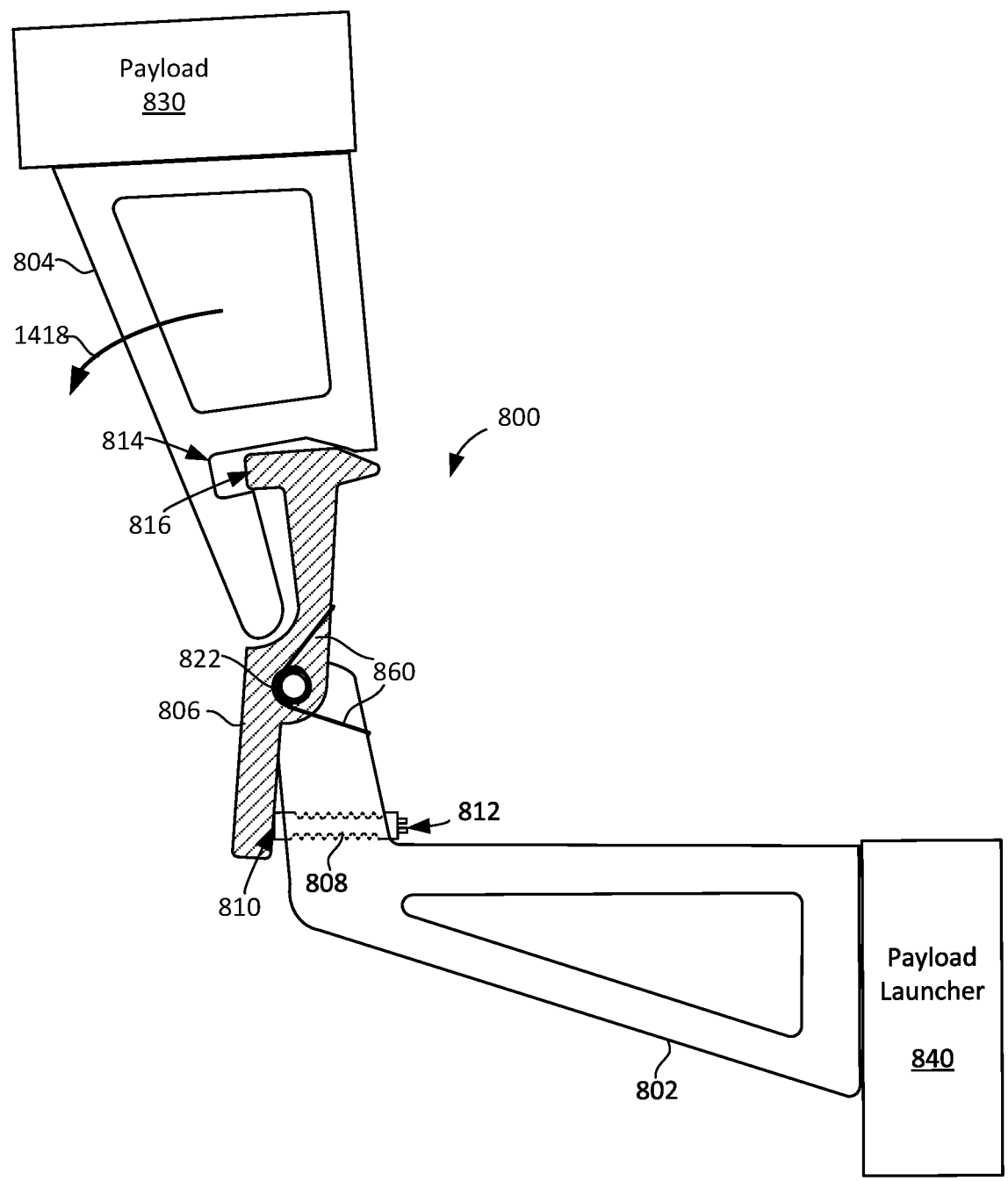
Figure 14D:
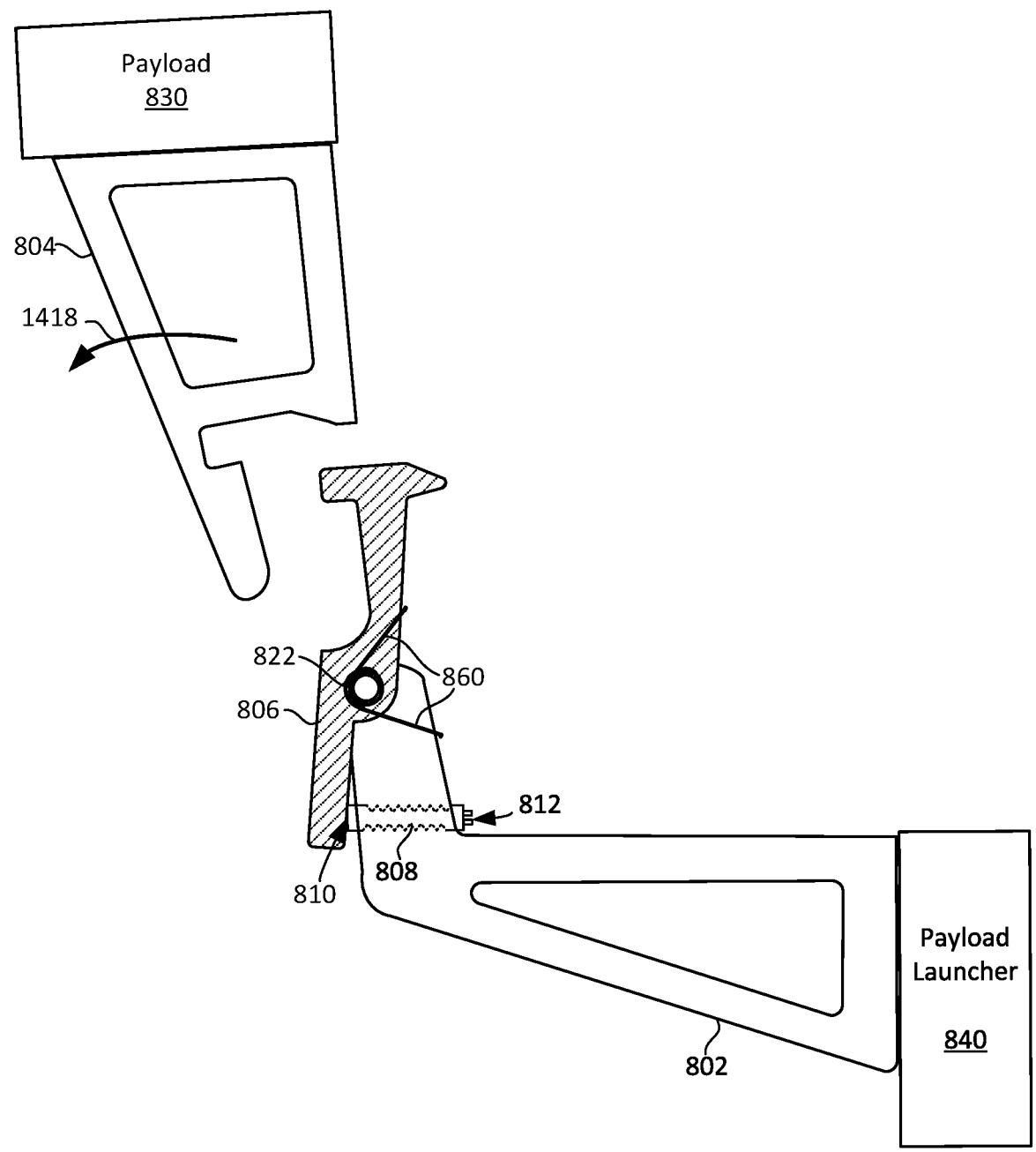

After the rotatable arm 806 comes into contact with the hinge stop 810, the rotatable arm 806 stops rotating about the hinge line. However, the momentum of the payload 830 will cause the upper bracket 804 to detach from the rotatable arm 806. FIG. 14C depicts the upper bracket 804 detaching from the rotatable arm 806 due to the momentum of the payload 830. Therefore, the payload 830 is deployed at a target angle. FIG. 14D depicts further separation of the payload 830 from the payload base 840 that results from the upper bracket 804 continuing to move away from the rotatable arm 806.

Figure 15:
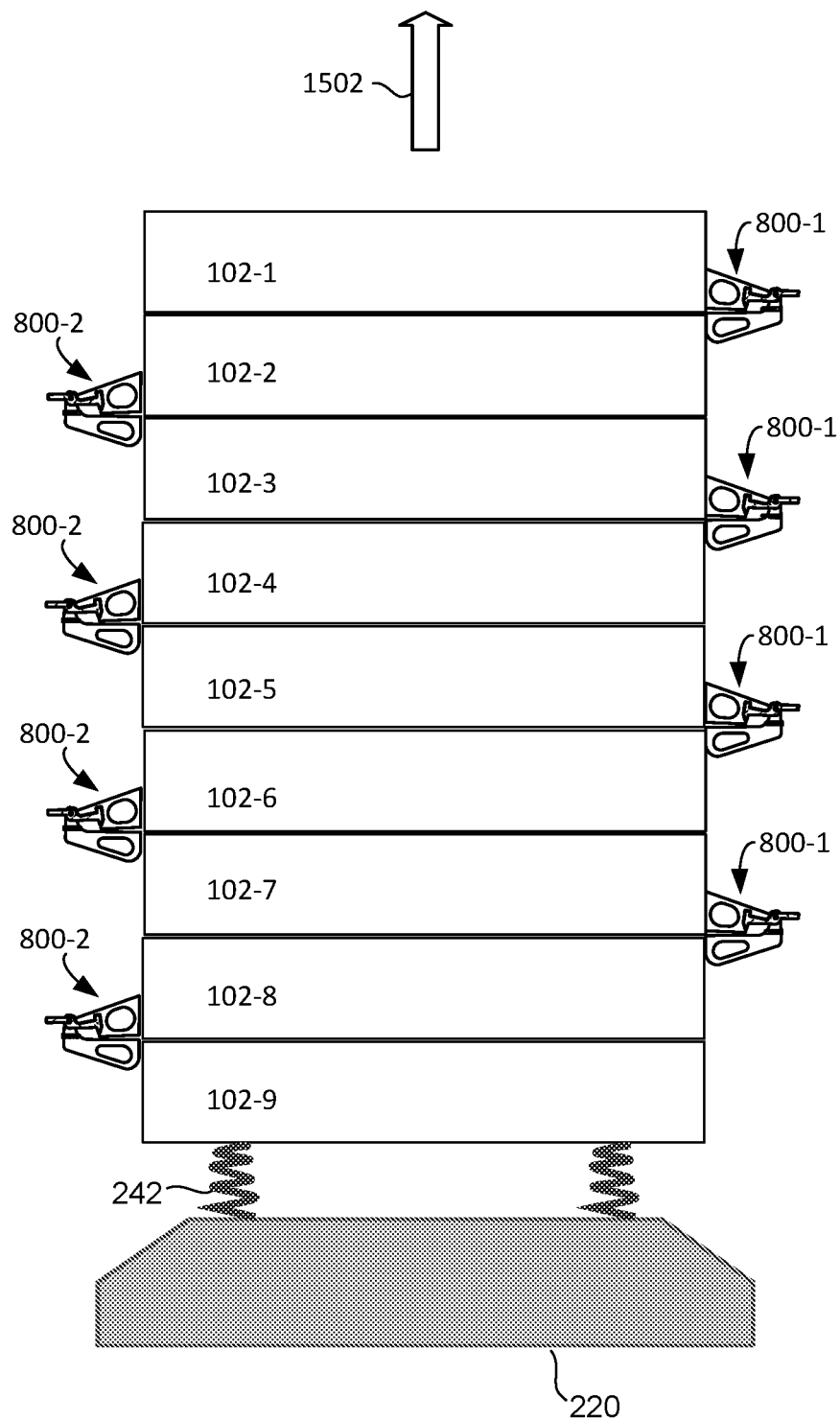
FIG. 15 depicts a stack of spacecraft held together in an accordion configuration by payload dispensing hinge assemblies.

The hinge assembly 800 has a wide range of applications in deploying a load into space. In one embodiment, a number of hinge assemblies 800 are used to deploy a stack of spacecraft. FIG. 15 depicts a stack of spacecraft 102-1 to 102-9 held together in an accordion configuration by hinge assemblies 800. A hinge assembly 800 is one embodiment of a dis-engageable link 240 that is disclosed herein. A first set of hinge assemblies 800-1 are depicted on one side of the stack. A second set of hinge assemblies 800-2 are on the opposite side of the stack. Although FIG. 15 only shows one hinge assembly 800 connecting each pair of adjacent spacecraft, in an embodiment there are two hinge assemblies 800 connecting each pair of adjacent spacecraft. Referring again to FIG. 5, two dis-engageable links 240 connect each pair of adjacent spacecraft. In an embodiment two hinge assemblies 800 are used to connect each pair of adjacent spacecraft instead of the links 240. Referring again to FIG. 15, spacecraft 102(1) and 102(2) are joined by a pair (only one hinge of the pair is depicted in FIG. 15) of hinge assemblies 800-1, spacecraft 102(3) and 102(4) are joined by a pair of hinge assemblies 800-1, spacecraft 102(5) and 102(6) are joined by a pair of hinge assemblies 800-1, and spacecraft 102(7) and 102(8) are joined by a pair of hinge assemblies 800-1. A second set of hinge assemblies 800-2 on the opposite side of the stack connect the following adjacent pairs: spacecraft 102(2) with spacecraft 102(3), spacecraft 102(4) with spacecraft 102(5), spacecraft 102(6) with spacecraft 102(7), and spacecraft 102(8) with spacecraft 102(9). This linkage pattern thus forms an accordion configuration. The stack of spacecraft in FIG. 15 is being pushed away from the launch adaptor 220 by springs 242. However, the springs are not required. Prior to this stage, the stack of spacecraft may be held down to the launch adaptor 220 by a hold down mechanism (not depicted in FIG. 15). Arrow 1502 is a velocity vector that represents the velocity of the stack of spacecraft away from the launch adaptor 220. The deploying of the spacecraft 102 may proceed in a similar way as described in connection with an embodiment depicted in FIGS. 6A-6D with each respective spacecraft being deployed when the angle between two adjacent spacecraft is at the target angle. The hinge assemblies 800 allow the target angle to be precisely controlled.

Figure 16A:
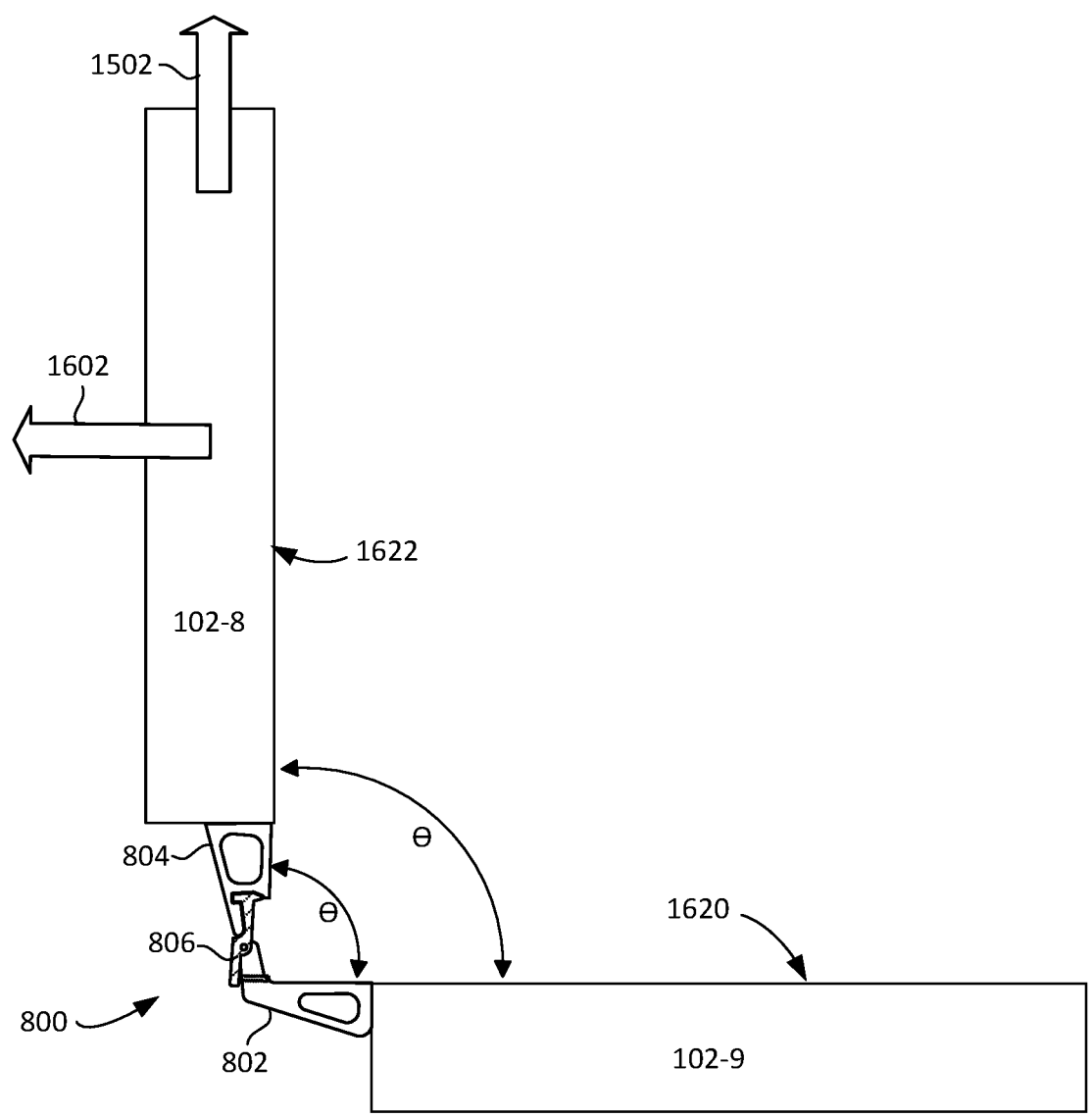

FIGS. 16A and 16B depicts further details of deploying a spacecraft 102 at a target angle using an embodiment of hinge assemblies 800. FIGS. 16A and 16B focus on two spacecraft 102-8, 102-9 from the stack in FIG. 15. FIG. 16A shows the spacecraft 102-8 and 102-9 when the angle ⊖ between major surface 1622 and major surface 1620 is at the target angle. Another way to express this is that the hinge assembly 800 has rotated by the target degrees. Arrow 1502 shows the velocity vector that is due to the stack of spacecraft being pushed away from the launch adaptor 220 by springs 242. Arrow 1602 shows a rotational induced dispensing velocity vector. FIG. 16B depicts spacecraft 102-8 having been dispensed after the hinge assemblies 800 (only one hinge assembly 800 depicted in FIG. 16B) that connected spacecraft 102-8 and 102-9 have disengaged (or release, disconnect, etc.).

Figure 17:
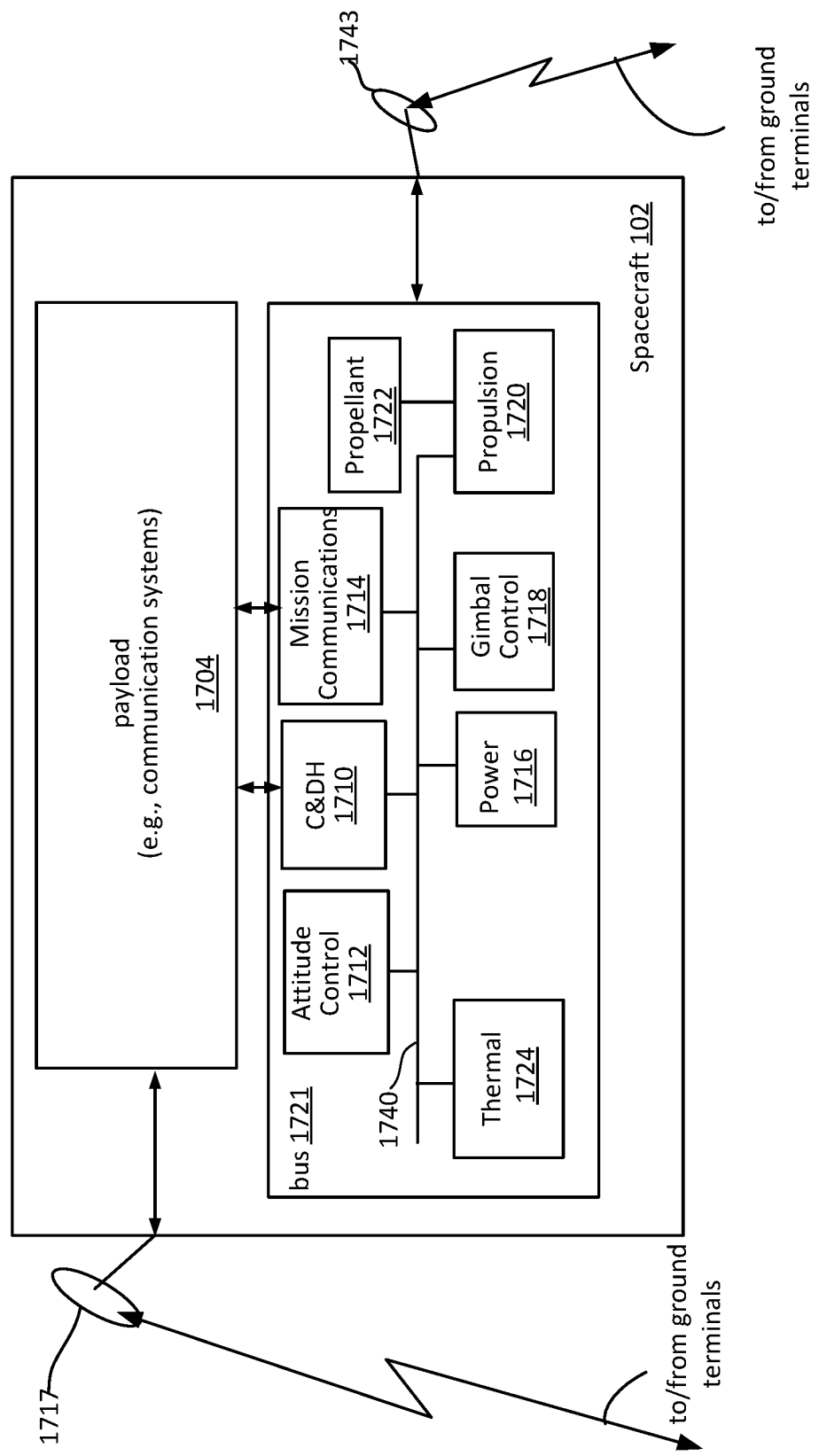
FIG. 17 is a block diagram of one embodiment of spacecraft, which in one example is a satellite.

FIG. 17 is a block diagram of one embodiment of spacecraft 102, which in one example (as discussed above) is a satellite. In one embodiment, spacecraft 102 includes a bus 1721 and a payload 1704 carried by bus 1721. Some embodiments of spacecraft 102 may include more than one payload. The payload provides the functionality of communication, sensors and/or processing systems needed for the mission of spacecraft 102.

In general, bus 1721 is the spacecraft that houses and carries the payload 1704, such as the components for operation as a communication satellite. The bus 1721 includes a number of different functional sub-systems or modules, some examples of which are shown. Each of the functional sub-systems typically include electrical systems, as well as mechanical components (e.g., servos, actuators) controlled by the electrical systems. These include a command and data handling sub-system (C&DH) 1710, attitude control systems 1712, mission communication systems 1714, power subsystems 1716, gimbal control electronics 1718 that be taken to include a solar array drive assembly, a propulsion system 1720 (e.g., thrusters), propellant 1722 to fuel some embodiments of propulsion system 1720, and thermal control subsystem 1724, all of which are connected by an internal communication network 1740, which can be an electrical bus (a "flight harness") or other means for electronic, optical or RF communication when spacecraft is in operation. Also represented are an antenna 1743, that is one of one or more antennae used by the mission communication systems 1714 for exchanging communications for operating of the spacecraft with ground terminals, and a payload antenna 1717, that is one of one or more antennae used by the payload 1704 for exchanging communications with ground terminals, such as the antennae used by a communication satellite embodiment. Other equipment can also be included.

The command and data handling module 1710 includes any processing unit or units for handling includes command control functions for spacecraft 102, such as for attitude control functionality and orbit control functionality. The attitude control systems 1712 can include devices including torque rods, wheel drive electronics, and control momentum gyro control electronics, for example, that are used to monitor and control the attitude of the spacecraft. Mission communication systems 1714 includes wireless communication and processing equipment for receiving telemetry data/commands, other commands from the ground control terminal 30 to the spacecraft and ranging to operate the spacecraft. Processing capability within the command and data handling module 1710 is used to control and operate spacecraft 102. An operator on the ground can control spacecraft 102 by sending commands via ground control terminal 30 to mission communication systems 1714 to be executed by processors within command and data handling module 1710. In one embodiment, command and data handling module 1710 and mission communication system 1714 are in communication with payload 1704. In some example implementations, bus 1721 includes one or more antennae as indicated at 1743 connected to mission communication system 1714 for wirelessly communicating between ground control terminal 30 and mission communication system 1714. Power subsystems 1716 can include one or more solar panels and charge storage (e.g., one or more batteries) used to provide power to spacecraft 102. Propulsion system 1720 (e.g., thrusters) is used for changing the position or orientation of spacecraft 102 while in space to move into orbit, to change orbit or to move to a different location in space. The gimbal control electronics 1718 can be used to move and align the antennae, solar panels, and other external extensions of the spacecraft 102.

In one embodiment, the payload 1704 is for a communication satellite and includes an antenna system (represented by the antenna 1717) that provides a set of one or more beams (e.g., spot beams) comprising a beam pattern used to receive wireless signals from ground stations and/or other spacecraft, and to send wireless signals to ground stations and/or other spacecraft. In some implementations, mission communication system 1714 acts as an interface that uses the antennae of payload 1704 to wirelessly communicate with ground control terminal 30. In other embodiments, the payload could alternately or additionally include an optical payload, such as one or more telescopes or imaging systems along with their control systems, which can also include RF communications to provide uplink/downlink capabilities.

An embodiment includes a system comprising a plurality of spacecraft, tension rods configured to tie down the plurality of spacecraft to a launch vehicle adaptor in a stack; one or more actuators configured to releases the tension rods such that the plurality of spacecraft are free of the launch vehicle adaptor, and a spacecraft dispensing system. The spacecraft dispensing system comprises a plurality of dis-engageable links that connect the stack of spacecraft in an accordion configuration with a first set of the dis-engageable links on a first side of the stack and a second set of the dis-engageable links on a second side of the stack opposite the first side, each link configured to connect a pair of adjacent spacecraft. The dispensing system is configured to force the spacecraft apart to unfold the accordion configuration. The links that connect a particular pair of adjacent spacecraft are configured to break the connection between a first member of the particular pair and a second member of the particular pair to dispense the second member after the particular pair have unfolded a sufficient amount to prevent collision of the second member with other spacecraft.

In a further embodiment, each adjacent pair of spacecraft are joined by two of the dis-engageable links that establish a hinge line.

In a further embodiment, each dis-engageable link comprises a torsion spring that is fixed to one member of an adjacent pair of spacecraft and slideably connected in a restraining slot of the other member of the adjacent pair due to torque of the torsion spring.

In a further embodiment, each torsion spring is configured to provide a torque to unfold the first member from the second member of the adjacent pair connected by the torsion spring.

In a further embodiment, each torsion spring is bent at an angle when the stack is in the accordion configuration to provide a force to keep the torsion spring in a restraining slot of the first member with the angle at which the torsion spring is bent reducing to provide the torque to unfold the first member from the second member.

In a further embodiment, each torsion spring is configured to slide out of the restraining slot after an angle between a first major surface of the first member and a second major surface of the second member reaches a deployment angle that prevents collision of the second member with other spacecraft.

In a further embodiment, the plurality of dis-engageable links each comprise a flat flexible strap that is fixed to the first member of a specific adjacent pair of spacecraft and slideably connected in a restraining slot of the second member of the specific adjacent pair.

In a further embodiment, the plurality of dis-engageable links each comprise a hinge assembly having a hinge pin, a first hinge-half, and a second hinge-half. The first hinge-half having a first bracket configured to attach to the second member of a specific pair of adjacent spacecraft. The first hinge-half has a rotatable arm configured to receive the hinge pin and to rotate around the hinge pin,. The first bracket and the rotatable arm are shaped to lock together and to allow the first bracket to disengage from the rotatable arm. The second hinge-half is configured to attach to the first member of the specific pair. The second hinge-half is configured to receive the hinge pin whereby the first member and the second member of the specific pair are free to rotate with respect to each other when the rotatable arm and the first bracket are locked together.

In a further embodiment, the second hinge-half further comprises a hinge stop configured to stop rotation of the rotatable arm at a target angle between the first member and second member of the specific pair. The first bracket is configured to disengage from the rotatable arm when the rotatable arm stops rotating due to momentum of the second member thereby dispensing the second member into space at the target angle.

In a further embodiment, the plurality of spacecraft are planar with major surfaces. The links that connect the particular pair of adjacent spacecraft are configured to dispense the second member of the particular pair at an angle of between approximately 60 degrees to 120 degrees separation between the major surfaces of the particular pair of spacecraft.

In a further embodiment, the plurality of spacecraft are planar with major surfaces. The links that connect the particular pair are configured to dispense the second member of the particular pair at an angle of between approximately 75 degrees to 115 degrees separation between the major surfaces of the particular pair of spacecraft to prevent collision of the second member with other spacecraft.

One embodiment includes a method for deploying stacked spacecraft. The method comprises assembling a plurality of planar spacecraft into an accordion configuration with a first set of dis-engageable links on a first side of the accordion configuration and a second set of the dis-engageable links on a second side of the accordion configuration opposite the first side. Each link connects a pair of adjacent spacecraft. The method comprises moving a hold-down assembly from a first configuration that ties down the accordion configuration to a launch vehicle adaptor to a second configuration to release the accordion configuration of planar spacecraft from the launch vehicle adaptor. The method comprises moving unfolding the accordion configuration of planar spacecraft after the hold-down assembly has been moved from the first configuration to the second configuration to cause each dis-engageable link to disengage from a first spacecraft of two adjacent spacecraft to release a second spacecraft of the two adjacent spacecraft after the two adjacent spacecraft have unfolded a sufficient amount to prevent collision of the second spacecraft with other spacecraft.

One embodiment includes a satellite deployment system comprising a hold-down assembly having a plurality of tension rods. The tension rods are configured to hold a stack of planar satellites to a launch vehicle adaptor under tension when in a launch configuration. The launch vehicle adaptor is configured to mechanically couple to a launch vehicle. The satellite deployment system includes a control circuit in communication with the hold-down assembly. The control circuit is configured to issue a control signal to the hold-down assembly to move the hold-down assembly from the launch configuration to a deployment configuration in which the tension rods are free from the stack. The satellite deployment system includes a plurality of dis-engageable links that connect the stack of planar satellites in an accordion configuration with a first set of the dis-engageable links on a first side of the stack and a second set of the dis-engageable links on a second side of the stack opposite the first side. The dis-engageable links are configured to allow the accordion configuration to unfold. The dis-engageable links are configured to release each respective planar satellite when an angle between the respective planar satellite and the planar satellite to which it is connected is within a target range of angles in order to deploy the respective planar satellite.

An embodiment includes a hinge assembly for deploying a payload into space. The hinge assembly comprises a hinge pin, first hinge-half, second hinge-half. The first hinge-half has a first bracket configured to attach to the payload. The first hinge-half further has a rotatable arm rotatably coupled to the hinge pin. The first bracket and the rotatable arm comprise respective shapes configured to lock together. The second hinge-half has a second bracket configured to attach to a payload base. The second bracket is coupled to the hinge pin. The second hinge-half has a hinge stop configured to stop rotation of the rotatable arm at a target angle. The hinge assembly also comprises a spring coupled between the rotatable arm and the second bracket. The spring is configured to apply a force to rotate the rotatable arm around the hinge pin whereby the first hinge-half and the second hinge-half can rotate with respect to each other when the rotatable arm and the first bracket are locked together. The first bracket is configured to release from the rotatable arm when the rotatable arm stops rotating at the target angle thereby deploying the payload into space.

In a further embodiment, the hinge stop is adjustable to allow the target angle to be adjusted.

In a further embodiment, the hinge stop comprises a screw residing in a body of the second bracket, a portion of the screw extends out of the second bracket to provide the hinge stop.

In a further embodiment, the biasing mechanism comprises a torsion spring having coils that surround the hinge pin. The torsion spring comprises one or more first legs that engage the second bracket. The torsion spring comprises one or more second legs that engage the rotatable arm. The torsion spring is configured to rotate the rotatable arm about a hinge line defined by a central axis of the hinge pin.

In a further embodiment, the biasing mechanism comprises a leaf spring.

In a further embodiment, the first bracket comprises a groove and the rotatable arm comprises a tongue configured to lock into the groove to lock the first bracket to the rotatable arm but to allow the first bracket to release from the rotatable arm due to momentum of the payload when the rotatable arm stopes rotating.

In a further embodiment, the rotatable arm further comprises a pivot cavity and the first bracket further comprises a tip configured to mate with the pivot cavity to constrain movement of the first bracket with respect to the rotatable arm.

In a further embodiment, the tip of the first bracket is configured to pivot off from the pivot cavity when the first bracket releases from the rotatable arm.

In a further embodiment, the payload comprises a first spacecraft and the payload base comprises a second spacecraft.

In a further embodiment, the payload comprises a first planar satellite and the payload base comprises a second planar satellite.

In a further embodiment, the respective shapes configured to lock the first bracket and the rotatable arm together comprise a first interlock configured to constrain the first bracket and the rotatable arm in a first one or more degrees of freedom. The shape further comprises a second interlock configured to constrain the first bracket and the rotatable arm in a second one or more degrees of freedom, wherein together the first interlock and the second interlock constrain the first bracket and the rotatable arm in six degrees of freedom.

An embodiment includes a method for deploying a payload into space. The method comprises rotating a first hinge-half with respect to a second hinge-half about a hinge line that joins the first hinge-half with the second hinge-half. Rotating the first hinge-half includes rotating a first bracket attached to the payload and rotating a rotatable arm locked to the first bracket. A payload base is attached to the second hinge-half. The method comprises stopping rotation of the rotatable arm at a target angle between the payload and the payload base, including stopping rotation of the rotatable arm at a hinge stop of the second hinge-half. The method comprises releasing the first bracket from the rotatable arm due to momentum of the payload thereby deploying the payload into space at the target angle.

An embodiment includes a payload dispensing system comprising a hinge pin and a first hinge-half having a first bracket configured to attach to a spacecraft. The first hinge-half further has a rotatable arm rotatably coupled to the hinge pin. The first bracket and the rotatable arm together have one or more interlocks configured to lock the first bracket to the rotatable arm. The payload dispensing system comprises a spring coupled to the rotatable arm and configured to apply a force to rotate the rotatable arm around the hinge pin. The payload dispensing comprises a second hinge-half configured to attach to a spacecraft launcher. The second hinge-half has a second bracket coupled to the hinge pin. The second hinge-half has a hinge stop configured to stop rotation of the rotatable arm at a target degrees of rotation of the rotatable arm. The first bracket is configured to release from the rotatable arm due to momentum of the spacecraft when the rotatable arm stops rotating at the target degrees of rotation to thereby deploy the spacecraft into space.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A hinge assembly for deploying a payload into space, the hinge assembly comprising:
    a hinge pin;
    a first hinge-half having a first bracket configured to attach to the payload, the first hinge-half further having a rotatable arm rotatably coupled to the hinge pin, wherein the first bracket and the rotatable arm comprise respective shapes configured to lock together;
    a second hinge-half having a second bracket configured to attach to a payload base, the second bracket coupled to the hinge pin, the second hinge-half having a hinge stop configured to stop rotation of the rotatable arm at a target angle; and
    a spring coupled between the rotatable arm and the second bracket, the spring configured to apply a force to rotate the rotatable arm around the hinge pin whereby the first hinge-half and the second hinge-half can rotate with respect to each other when the rotatable arm and the first bracket are locked together;
    wherein the first bracket is configured to release from the rotatable arm when the rotatable arm stops rotating at the target angle thereby deploying the payload into space.

2. The hinge assembly of claim 1, wherein the hinge stop is adjustable to allow the target angle to be adjusted.

3. The hinge assembly of claim 2, wherein:
    the hinge stop comprises a screw residing in a body of the second bracket configured for the adjusting of the target angle, a portion of the screw extending out of the second bracket to provide the hinge stop.

4. The hinge assembly of claim 1, wherein the spring comprises:
a torsion spring having coils that surround the hinge pin, the torsion spring comprising: one or more first legs that engage the second bracket, one or more second legs that engage the rotatable arm, and the torsion spring being configured to apply the force to rotate the rotatable arm about a hinge line defined by a central axis of the hinge pin.

5. The hinge assembly of claim 1, wherein the spring comprises a leaf spring.

6. The hinge assembly of claim 1, wherein:
the first bracket comprises a groove; and
the rotatable arm comprises a tongue configured to lock into the groove to lock the first bracket to the rotatable arm and allow the first bracket to release from the rotatable arm due to momentum of the payload when the rotatable arm stops rotating.

7. The hinge assembly of claim 6, wherein:
the rotatable arm further comprises a pivot cavity; and
the first bracket further comprises a tip configured to mate with the pivot cavity to constrain movement of the first bracket with respect to the rotatable arm.

8. The hinge assembly of claim 7, wherein:
the tip of the first bracket is configured to pivot off from the pivot cavity when the first bracket releases from the rotatable arm.

9. The hinge assembly of claim 1, wherein:
the payload comprises a first spacecraft; and
the payload base comprises a second spacecraft.

10. The hinge assembly of claim 1, wherein:
the payload comprises a first planar satellite; and
the payload base comprises a second planar satellite.

11. The hinge assembly of claim 1, wherein the respective shapes configured to lock the first bracket and the rotatable arm together comprise:
a first interlock configured to constrain the first bracket and the rotatable arm in a first one or more degrees of freedom; and
a second interlock configured to constrain the first bracket and the rotatable arm in a second one or more degrees of freedom, wherein together the first interlock and the second interlock constrain the first bracket and the rotatable arm in six degrees of freedom.

12. A method for deploying a payload into space, the method comprising:
rotating a first hinge-half with respect to a second hinge-half about a binge line that joins the first hinge-half with the second hinge-half, rotating the first hinge-half including rotating a first bracket attached to the payload and rotating a rotatable arm locked to the first bracket, wherein a payload base is attached to the second hinge-half;
stopping rotation of the rotatable arm at a target angle between the payload and the payload base, including stopping rotation of the rotatable arm at a hinge stop of the second hinge-half; and
releasing the first bracket from the rotatable arm due to momentum of the payload thereby deploying the payload into space at the target angle.

13. The method of claim 12, wherein rotating the rotatable arm locked to the first bracket comprises:
releasing a torsion spring that provides a rotational torque to the rotatable arm.

14. A spacecraft dispensing system comprising:
a hinge pin;
a first hinge-half having a first bracket configured to attach to a spacecraft, the first hinge-half further having a rotatable arm rotatably coupled to the hinge pin, the first bracket and the rotatable arm together having one or more interlocks configured to lock the first bracket to the rotatable arm;
a spring coupled to the rotatable arm and configured to apply a force to rotate the rotatable arm around the hinge pin; and
a second hinge-half configured to attach to a spacecraft launcher, the second hinge-half having a second bracket coupled to the hinge pin, the second hinge-half having a hinge stop configured to stop rotation of the rotatable arm at a target degrees of rotation of the rotatable arm, the first bracket configured to release from the rotatable arm due to momentum of the spacecraft when the rotatable arm stops rotating at the target degrees of rotation to thereby deploy the spacecraft into space.

15. The system of claim 14, wherein the hinge stop comprises a screw that allows the target degrees of rotation to be adjusted.

16. The system of claim 14, wherein the spring comprises:
a torsion spring having coils that surround the hinge pin, the torsion spring comprising one or more first legs that engage the second bracket, the torsion spring comprising one or more second legs that engage the rotatable arm, the torsion spring being configured to apply the force to rotate the rotatable arm around the hinge pin.

17. The system of claim 14, wherein the one or more interlocks comprise:
a groove in the first bracket; and
a tongue in the rotatable arm configured to lock into the groove to lock the first bracket to the rotatable arm and allow the first bracket to release from the rotatable arm due to momentum of the spacecraft when the rotatable arm stops rotating at the target degrees of rotation.

18. The system of claim 17, wherein the one or more interlocks further comprise:
a pivot cavity in rotatable arm; and
a tip of the first bracket configured to mate with the pivot cavity to constrain movement of the first bracket with respect to the rotatable arm.

19. The system of claim 18, wherein the tip of the first bracket is configured to pivot off from the pivot cavity when the first bracket releases from the rotatable arm.

20. The system of claim 14, wherein:
the spacecraft comprises a first planar satellite; and
the spacecraft launcher comprises a second planar satellite.

* * * * *

UNITED STATES PATENT AND TRADEMARK OFFICE
CERTIFICATE OF CORRECTION

PATENT NO. : 12,214,909 B1  
APPLICATION NO. : 18/353548  
DATED : February 4, 2025  
INVENTOR(S) : Baghdasarian Page 1 of 1

It is certified that error appears in the above-identified patent and that said Letters Patent is hereby corrected as shown below:

In the Claims

Column 19, Line 51 (Claim 12, Line 4) please change "binge line" to -- hinge line --

Signed and Sealed this  
Seventeenth Day of June, 2025

Coke Morgan Stewart  
*Acting Director of the United States Patent and Trademark Office*